United States Patent
Yang et al.

(10) Patent No.: US 9,860,919 B2
(45) Date of Patent: Jan. 2, 2018

(54) METHOD FOR TRANSMITTING SIGNAL FOR MTC AND APPARATUS FOR SAME

(71) Applicant: LG ELECTRONICS INC., Seoul (KR)

(72) Inventors: Suckchel Yang, Seoul (KR); Joonkui Ahn, Seoul (KR); Yunjung Yi, Seoul (KR); Hyangsun You, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/903,447

(22) PCT Filed: Jul. 28, 2014

(86) PCT No.: PCT/KR2014/006891
§ 371 (c)(1),
(2) Date: Jan. 7, 2016

(87) PCT Pub. No.: WO2015/012666
PCT Pub. Date: Jan. 29, 2015

(65) Prior Publication Data
US 2016/0381712 A1    Dec. 29, 2016

Related U.S. Application Data

(60) Provisional application No. 61/858,633, filed on Jul. 26, 2013, provisional application No. 61/862,526, (Continued)

(51) Int. Cl.
*H04B 7/00* (2006.01)
*H04W 74/08* (2009.01)
(Continued)

(52) U.S. Cl.
CPC ....... *H04W 74/0833* (2013.01); *H04W 4/005* (2013.01); *H04W 72/0413* (2013.01);
(Continued)

(58) Field of Classification Search
CPC . H04W 74/0833; H04W 4/005; H04W 74/08; H04W 72/0446; H04W 72/12; H04W 88/02
(Continued)

(56) References Cited

U.S. PATENT DOCUMENTS

2004/0208136 A1* 10/2004 Dick ................ H04B 7/2618
370/280
2007/0224963 A1*  9/2007 Moscovitz ........... H04K 3/222
455/296

(Continued)

FOREIGN PATENT DOCUMENTS

WO    WO 2013/009068 A2    1/2013
WO    WO 2013/027101 A     2/2013

OTHER PUBLICATIONS

3GPP, "Technical Specification Group Radio Access Network; Study on provision of low-cost Machine-Type Communications (MTC) User Equipments (UEs) based on LTE (Release 12)", 3GPP TR 36.888 V12.0.0, Jun. 2013, pp. 1-55.
(Continued)

*Primary Examiner* — Brenda H Pham
(74) *Attorney, Agent, or Firm* — Birch, Stewart, Kolasch & Birch, LLP

(57) ABSTRACT

The present invention relates to a method for transreceiving a signal in a wireless communication system supporting repeated transmission of a same signal, and an apparatus for same, and more specifically, to a method and an apparatus for same, the method comprising the steps of: repeatedly transmitting a first physical random access channel
(Continued)

\* The second PRACH signal is transmitted using the first PRACH resource.
\* The second PRACH signal is transmitted using a PRACH resource corresponding to a repetition number of the first PRACH signal.
\* The second PRACH signal is transmitted using a PRACH resource corresponding to a smallest repetition number from among repetition numbers greater than the repetition number of the first PRACH signal.
\* The second PRACH signal is transmitted using a PRACH resource corresponding to a greatest repetition number from among repetition numbers smaller than the repetition number of the first PRACH signal.

(PRACH) signal by using a first PRACH resource, wherein the number of transmissions equal a first repetition number; receiving a random access response (RAR) with respect to the first PRACH signal; and transmitting a second PRACH signal for requesting scheduling, wherein a plurality of PRACH resources are pre-established for transmitting the second PRACH signal, a second plurality of repetition numbers that are different are pre-established for the plurality of PRACH resources, wherein the second PRACH signal is repeatedly transmitted by using the first PRACH resource, wherein the number of transmissions equal a repetition number set for the first PRACH resource, when the first PRACH resource matches one of the plurality of PRACH resources, and wherein the second PRACH signal is repeatedly transmitted by using a PRACH resource corresponding to the first repetition number from among the plurality of PRACH resources, wherein the number of transmissions equal the first repetition number, when the first repetition number matches one of the second plurality of repetition numbers.

12 Claims, 8 Drawing Sheets

Related U.S. Application Data filed on Aug. 6, 2013, provisional application No. 61/863,450, filed on Aug. 8, 2013, provisional application No. 61/884,979, filed on Sep. 30, 2013, provisional application No. 61/894,904, filed on Oct. 23, 2013, provisional application No. 61/897,200, filed on Oct. 29, 2013, provisional application No. 61/903,413, filed on Nov. 13, 2013, provisional application No. 61/906,424, filed on Nov. 20, 2013, provisional application No. 61/910,970, filed on Dec. 3, 2013, provisional application No. 61/919,825, filed on Dec. 23, 2013, provisional application No. 61/921,520, filed on Dec. 29, 2013, provisional application No. 61/925,664, filed on Jan. 10, 2014, provisional application No. 61/928,003, filed on Jan. 16, 2014, provisional application No. 61/929,107, filed on Jan. 19, 2014, provisional application No. 61/939,291, filed on Feb. 13, 2014.

(51) Int. Cl.
  *H04W 4/00* (2009.01)
  *H04W 72/04* (2009.01)
  *H04W 72/12* (2009.01)
  *H04W 88/02* (2009.01)

(52) U.S. Cl.
  CPC ....... *H04W 72/0446* (2013.01); *H04W 72/12* (2013.01); *H04W 74/08* (2013.01); *H04W 88/02* (2013.01)

(58) Field of Classification Search
  USPC ..... 370/310.2, 314, 321, 319, 330, 338, 328
  See application file for complete search history.

(56) References Cited

U.S. PATENT DOCUMENTS

| | | | |
|---|---|---|---|
| 2010/0110994 A1* | 5/2010 | Ratsuk | H04B 1/713 370/329 |
| 2013/0083753 A1 | 4/2013 | Lee et al. | |
| 2014/0198742 A1* | 7/2014 | Baldemair | H04W 74/0833 370/329 |

OTHER PUBLICATIONS

China Telecom, "On PRACH Coverage Improvement Low-cost MTC UE", 3GPP TSG RAN WG1 Meeting#72b, Apr. 15-19, 2013, R1-131134, 4 pages.

ZTE, "PRACH PSD boosting performance evaluation for TR36.888", 3GPP TSG RAN WG1 Meeting #73, R1-132664, May 20-24, 2013, 5 pages.

3GPP, "3rd Generation Partnership Project; Technical Specification Group Radio Access Network; Evolved Universal Terrestrial Radio Access (E-UTRA); Medium Access Control (MAC) protocol specification (Release 11)," 3GPP TS 36.321, V11.3.0, Jun. 2013, pp. 1-57.

Alcatel-Lucent et al., "Feasibility of coverage extension of physical channels for MTC devices," 3GPP TSG-RAN WG1 Meeting #72, R1-130462, St. Julian's, Malta, Jan. 28-Feb. 1, 2013, 7 pages.

\* cited by examiner

FIG. 9

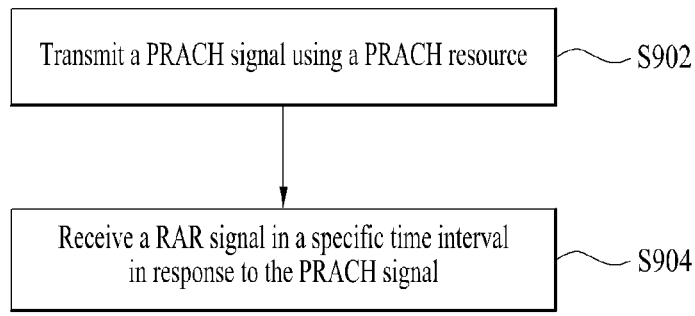

\* The RAR signal includes information about a repeated transmission number for the PRACH signal.

FIG. 10

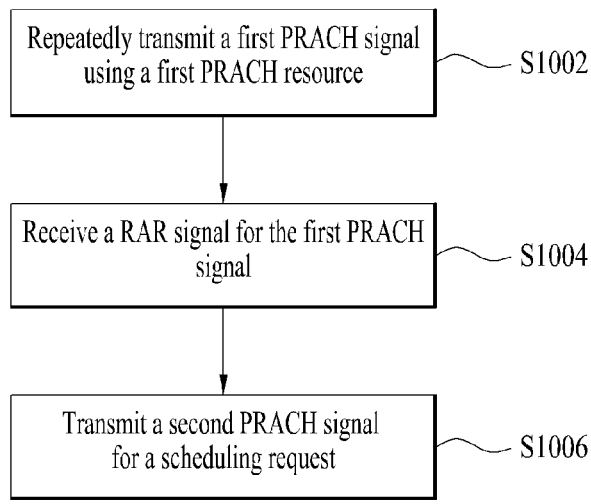

\* The second PRACH signal is transmitted using the first PRACH resource.
\* The second PRACH signal is transmitted using a PRACH resource corresponding to a repetition number of the first PRACH signal.
\* The second PRACH signal is transmitted using a PRACH resource corresponding to a smallest repetition number from among repetition numbers greater than the repetition number of the first PRACH signal.
\* The second PRACH signal is transmitted using a PRACH resource corresponding to a greatest repetition number from among repetition numbers smaller than the repetition number of the first PRACH signal.

METHOD FOR TRANSMITTING SIGNAL FOR MTC AND APPARATUS FOR SAME

CROSS REFERENCE TO RELATED APPLICATIONS

This application is the National Phase of PCT International Application No. PCT/KR2014/006891, filed on Jul. 28, 2014, which claims priority under 35 U.S.C. 119(e) to U.S. Provisional Application Nos. 61/858,633, filed on Jul. 26, 2013, 61/862,526, filed on Aug. 6, 2013, 61/863,450, filed on Aug. 8, 2013, 61/884,979, filed on Sep. 30, 2013, 61/894,904, filed on Oct. 23, 2013, 61/897,200, filed on Oct. 29, 2013, 61/903,413, filed on Nov. 13, 2013, 61/906,424, filed on Nov. 20, 2013, 61/910,970, filed on Dec. 3, 2013, 61/919,825, filed on Dec. 23, 2013, 61/921,520, filed on Dec. 29, 2013, 61/925,664, filed on Jan. 10, 2014, 61/928,003, filed on Jan. 16, 2014, 61/929,107, filed on Jan. 19, 2014, 61/939,291, filed on Feb. 13, 2014, all of which are hereby expressly incorporated by reference into the present application.

TECHNICAL FIELD

The present invention relates to a method and apparatus for transmitting a signal in a wireless communication system. More particularly, the present invention relates to a method and apparatus for transmitting and receiving a signal for machine type communication (MTC).

BACKGROUND ART

Recently, wireless communication systems are widely developed to provide various kinds of communication services including audio communications, data communications and the like. Generally, a wireless communication system is a kind of a multiple access system capable of supporting communications with multiple users by sharing available system resources (e.g., bandwidth, transmission power, etc.). For instance, multiple access systems include CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) and the like. In a wireless communication system, a user equipment (UE) may receive information from a base station in downlink (DL), and the user equipment may transmit information to the base station in uplink (UL). The information transmitted or received by the UE may include data and various control information. In addition, there are various physical channels according to the type or use of the information transmitted or received by the UE.

DISCLOSURE

Technical Problem

An object of the present invention is to provide a method and apparatus for effectively transmitting and receiving a signal in a wireless communication system, and more specifically, to provide a method and apparatus for effectively transmitting and receiving a signal for machine type communication (MTC).

Another object of the present invention is to provide a method and apparatus for effective signal transmission and reception for coverage enhancement in a wireless communication system, and more specifically, to provide effective signal configuration and transceive timing when the same signal is repeatedly transmitted and received for coverage enhancement in a wireless communication system.

Another object of the present invention is to provide a method and apparatus for effectively signaling/configuring information involved in a random access procedure in a wireless communication system, and more specifically, to provide a method and apparatus for effectively signaling/configuring information involved in a random access procedure based on repeated transmission for coverage enhancement in a wireless communication system.

It is to be understood that both the foregoing general description and the following detailed description of the present invention are exemplary and explanatory and are intended to provide further explanation of the invention as claimed.

Technical Solution

In an aspect of the present invention, provided herein is a method for transmitting and receiving a signal by a user equipment (UE) in a wireless communication system supporting repeated transmission of a same signal, the method comprising: repeatedly transmitting a first physical random access channel (PRACH) signal a first repetition number of times using a first PRACH resource; receiving a random access response (RAR) for the first PRACH signal; and transmitting a second PRACH signal for a scheduling request, wherein a plurality of PRACH resources are preconfigured for transmission of the second PRACH signal, and a second plurality of repetition numbers are preconfigured for the plurality of PRACH resources, the second plurality of repetition numbers being different, wherein when the first PRACH resource corresponds to one of the plurality of PRACH resources, the second PRACH signal is repeatedly transmitted using the first PRACH resource a repetition number of times configured for the first PRACH signal, and wherein when the first repetition number corresponds to one of the second plurality of repetition numbers, the second PRACH signal is repeatedly transmitted using a PRACH resource corresponding to the first repetition number of times from among the plurality of PRACH resources.

In another aspect of the present invention, provided herein is a user equipment for transmitting and receiving a signal in a wireless communication system supporting repeated transmission of a same signal, the UE comprising: a radio frequency (RF) unit; and a processor operatively connected to the RF unit and configured to: repeatedly transmit a first physical random access channel (PRACH) signal a first repetition number of times using a first PRACH resource, receive a random access response (RAR) for the first PRACH signal; and transmitting a second PRACH signal for a scheduling request, wherein a plurality of PRACH resources are preconfigured for transmission of the second PRACH signal, and a second plurality of repetition numbers are preconfigured for the plurality of PRACH resources, the second plurality of repetition numbers being different, wherein when the first PRACH resource corresponds to one of the plurality of PRACH resources, the second PRACH signal is repeatedly transmitted using the first PRACH resource a repetition number of times configured for the first PRACH signal, and wherein when the first repetition number corresponds to one of the second plurality of repetition numbers, the second PRACH signal is repeatedly transmitted using a PRACH resource corresponding to the first repetition number from among the plurality of PRACH resources.

Preferably, when the first PRACH resource does not correspond to one of the plurality of PRACH resources and the first repetition number does not correspond to one of the second plurality of repetition numbers, the second PRACH signal is transmitted using a PRACH resource corresponding to a smallest repetition number from among repetition numbers greater than the first repetition number from among the plurality of PRACH resources.

Preferably, when the first PRACH resource does not correspond to one of the plurality of PRACH resources and the first repetition number does not correspond to one of the second plurality of repetition numbers, the second PRACH signal is transmitted using a PRACH resource corresponding to a greatest repetition number from among repetition numbers smaller than the first repetition number from among the plurality of PRACH resources.

Preferably, when a PRACH repetition number is signaled through a higher layer signal or a physical downlink control channel (PDCCH) signal, the second PRACH signal is transmitted using a PRACH resource corresponding to the signaled PRACH repetition number from among the plurality of PRACH resources.

Preferably, a first plurality of repetition numbers are configured for reception of the random access response, and when the random access response is received using a specific repetition number from among the first plurality of repetition numbers, a response signal for the second PRACH signal is received using the specific repetition number.

Preferably, a first plurality of repetition numbers are configured for reception of the random access response, and the first plurality of repetition numbers correspond to respective resources used for transmission of the first PRACH signal, and a response signal for the second PRACH signal is received using a repetition number corresponding to a resource used for transmission of the first PRACH signal.

Advantageous Effects

According to the present invention, a signal may be effectively transmitted and received in a wireless communication system, and more specifically, a signal may be effectively transmitted and received in a wireless communication system for machine type communication (MTC).

According to the present invention, a signal may be effectively transmitted and received for coverage enhancement in a wireless communication system, and more specifically, a signal may be effectively configured and transceiving timing may be effectively determined when the same signal is repeatedly transmitted and received for coverage enhancement in a wireless communication system.

According to the present invention, information involved in a random access procedure may be effectively signaled/configured in a wireless communication system, and more specifically, information involved in a random access procedure based on repeated transmission for coverage enhancement may be effectively signaled/configured in a wireless communication system in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIGS. 9 and 10 illustrate exemplary methods according to the present invention.

MODE FOR INVENTION

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). $3^{rd}$ generation partnership project (3GPP) long term evolution (LTE) is a part of E-UMTS (Evolved UMTS), which uses E-UTRA. LTE-Advanced (LTE-A) is an evolved version of 3GPP LTE.

For clarity of explanations, the following description focuses on 3GPP LTE(-A) system. However, technical principles of the present invention are not limited thereto. Further, a particular terminology is provided for better understanding of the present invention. However, such a particular terminology may be changed without departing from the technical principles of the present invention. For example, the present invention may be applied to a system in accordance with a 3GPP LTE/LTE-A system as well as a system in accordance with another 3GPP standard, IEEE 802.xx standard, 3GPP2 standard, or a next-generation communication standard.

In a wireless access system, a user equipment (UE) may receive information from a BS in downlink (DL) and transmit information in uplink (UL). The information transmitted or received by the UE may include data and various control information. In addition, there are various physical channels according to the type or use of the information transmitted or received by the UE.

Figure 1:
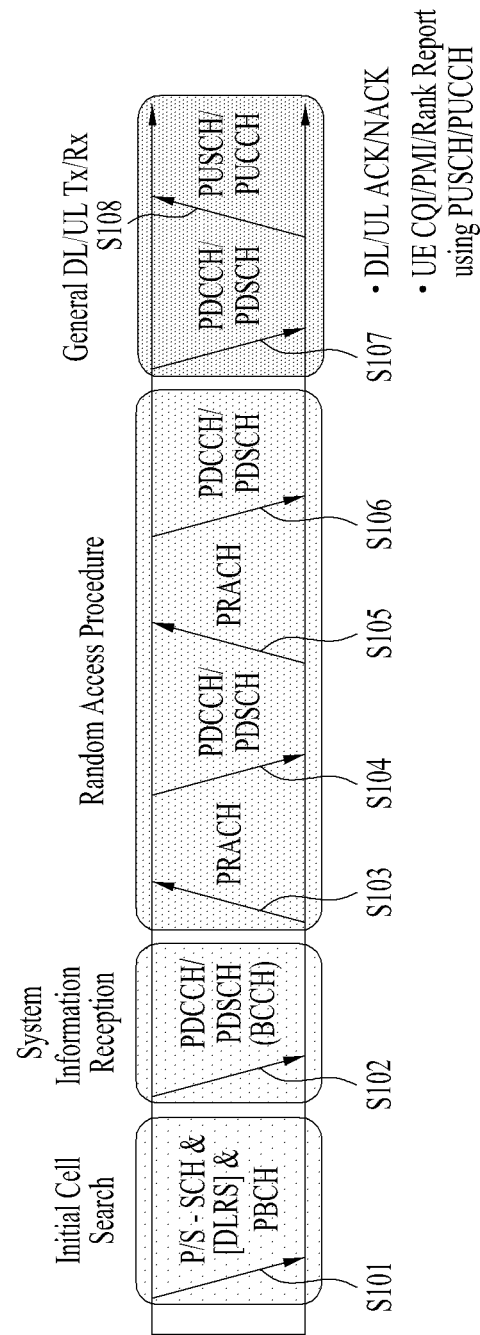
FIG. 1 illustrates physical channels and a general method for transmitting signals on the physical channels in the present invention.

FIG. 1 illustrates physical channels and a general method for transmitting signals on the physical channels in the present invention.

When a UE is powered on or enters a new cell, the UE performs initial cell search in step S101. The initial cell search involves acquisition of synchronization to an eNB. To this end, the UE synchronizes its timing to the eNB and acquires information such as a cell identifier (ID) by receiving a primary synchronization channel (P-SCH) and a secondary synchronization channel (S-SCH) from the eNB. Then the UE may acquire broadcast information in the cell by receiving a physical broadcast channel (PBCH) from the eNB. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S102.

To complete access to the eNB, the UE may perform a random access procedure such as steps S103 to S106 with the eNB. To this end, the UE may transmit a preamble on a physical random access channel (PRACH) (S103) and may receive a response message to the preamble on a PDCCH and a PDSCH associated with the PDCCH (S104). In the case of a contention-based random access, the UE may additionally perform a contention resolution procedure including transmission of an additional PRACH (S105) and reception of a PDCCH signal and a PDSCH signal corresponding to the PDCCH signal (S106).

After the above procedure, the UE may receive a PDCCH and/or a PDSCH from the eNB (S107) and transmit a physical uplink shared channel (PUSCH) and/or a physical uplink control channel (PUCCH) to the eNB (S108), in a general UL/DL signal transmission procedure. Information that the UE transmits to the eNB is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted on a PUCCH periodically. However, if control information and traffic data should be transmitted simultaneously, they may be transmitted on a PUSCH. In addition, the UCI may be transmitted aperiodically on the PUSCH, upon receipt of a request/command from a network.

Figure 2:
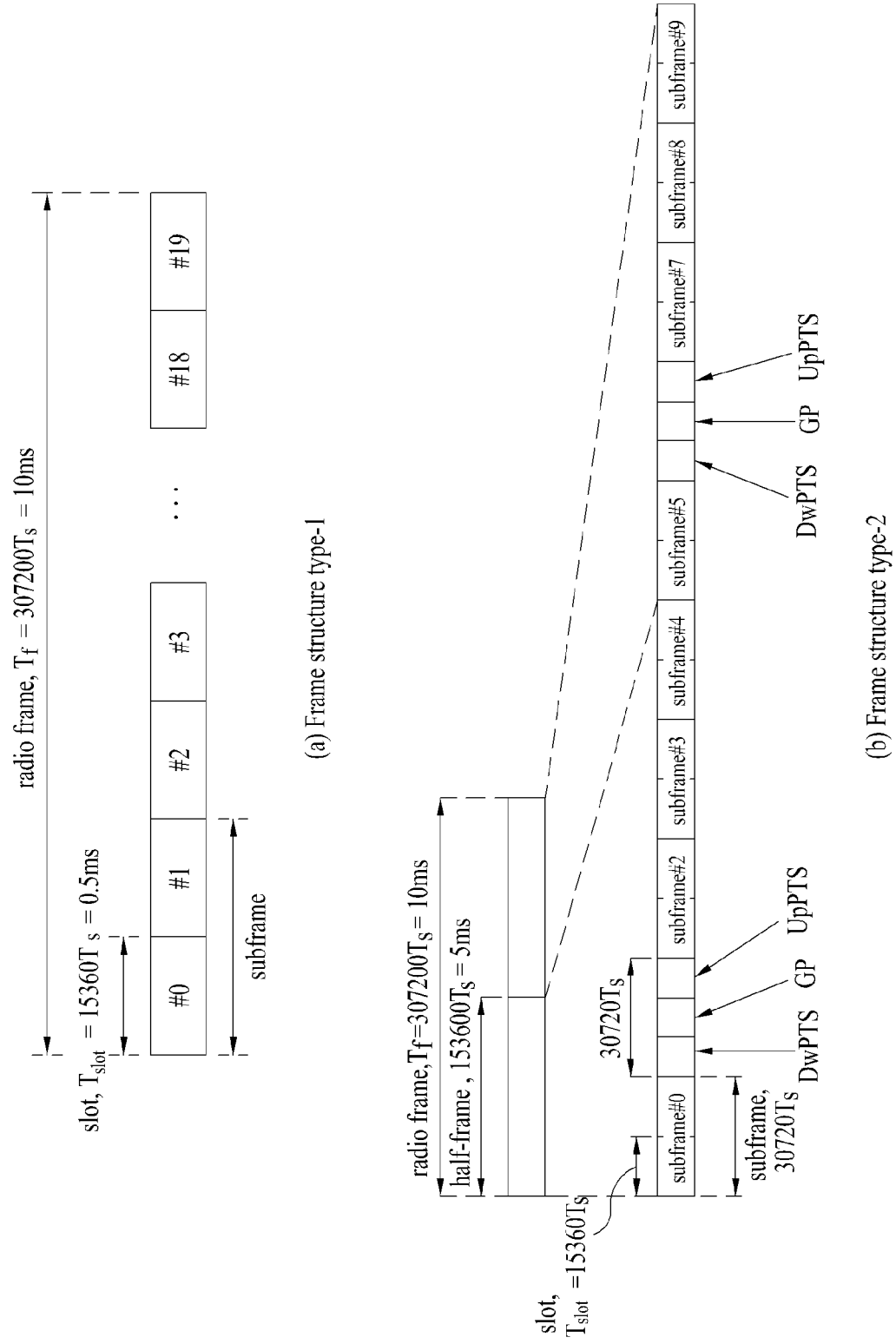
FIG. 2 illustrates a structure of a radio frame used in the present invention.

FIG. 2 illustrates a structure of a radio frame used in the present invention. In a cellular OFDM radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 2(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDMA is used in downlink, an OFDM symbol indicates one symbol period. The OFDM symbol may be referred to as an SC-FDMA symbol or symbol period. A RB as a resource assignment unit may include a plurality of consecutive subcarriers in one slot.

The number of OFDM symbols included in one slot may be changed according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

FIG. 2(b) shows the structure of the type-2 radio frame. The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a BS and uplink transmission synchronization of a UE. For example, the uplink slot (e.g., UpPTS) may be used to transmit a sounding reference signal (SRS) for channel estimation in an eNB and to transmit a physical random access channel (PRACH) that carriers a random access preamble for uplink transmission synchronization. The GP is used to eliminate interference generated in uplink due to multi-path delay of a downlink signal between uplink and downlink. Table 1 below shows an uplink (UL)-downlink (DL) configuration in subframes in a radio frame in a TDD mode.

TABLE 1

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D represents a DL subframe, U represents a UL subframe, and S represents a special subframe. The special subframe includes a downlink pilot timeslot (DwPTS), a guard period (GP), and an uplink pilot timeslot (UpPTS). Table 2 below shows a special subframe configuration.

TABLE 2

| | | Normal cyclic prefix downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The above-described radio frame structure is purely exemplary and thus the number of subframes in a radio frame, the number of slots in a subframe, or the number of symbols in a slot may vary in different ways.

Figure 3:
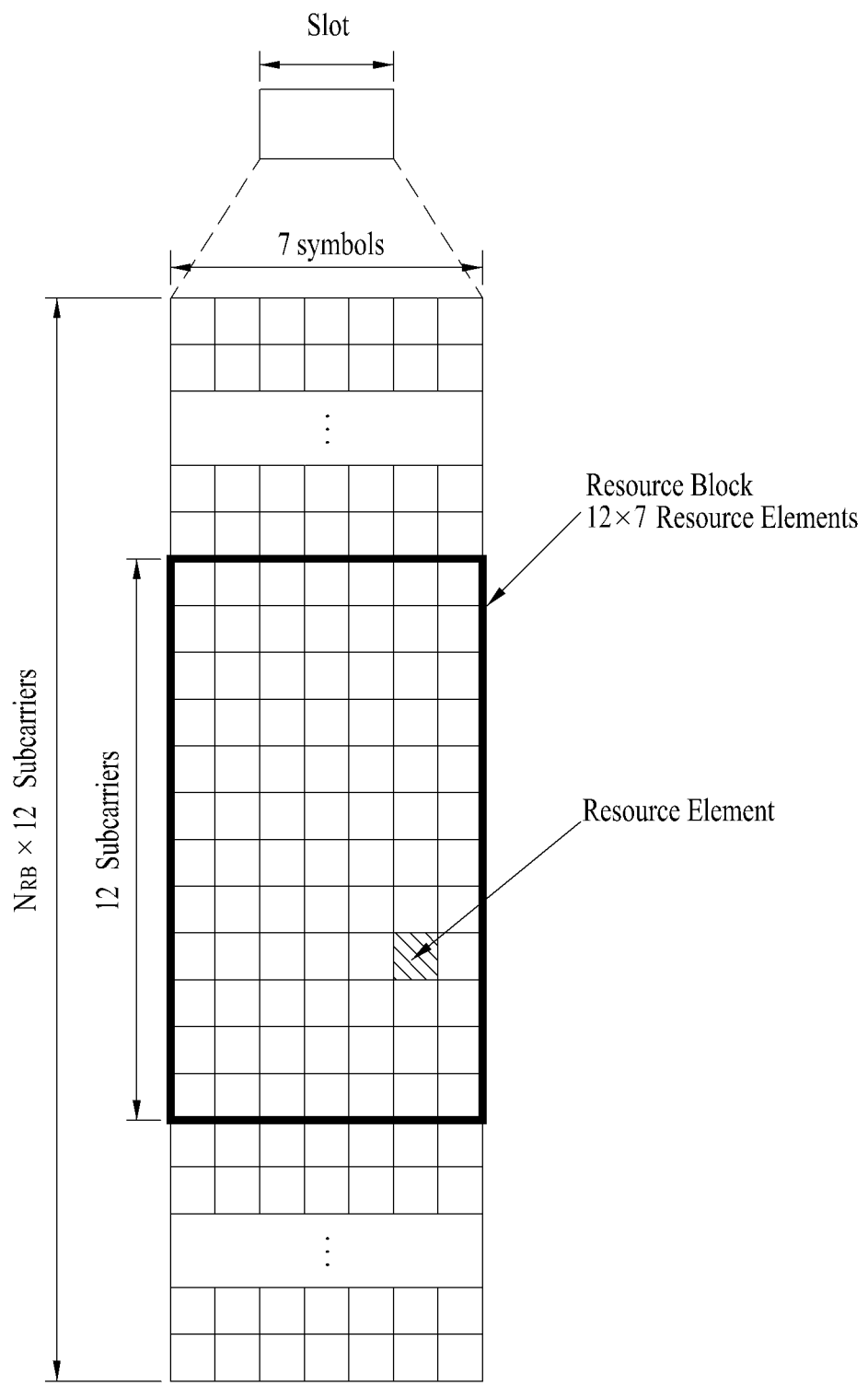
FIG. 3 illustrates a resource grid of one DL slot used in the present invention.

FIG. 3 illustrates a resource grid of one DL slot used in the present invention.

Referring to FIG. 3, a DL slot includes a plurality of OFDM symbols in the time domain. One DL slot may include 7 OFDM symbols and a resource block (RB) may include 12 subcarriers in the frequency domain. However, the present invention is not limited thereto. Each element of the resource grid is referred to as a Resource Element (RE). An RB includes 12×7 REs. The number of RBs in a DL slot, $N^{DL}$ depends on a DL transmission bandwidth. A UL slot may have the same structure as a DL slot.

Figure 4:
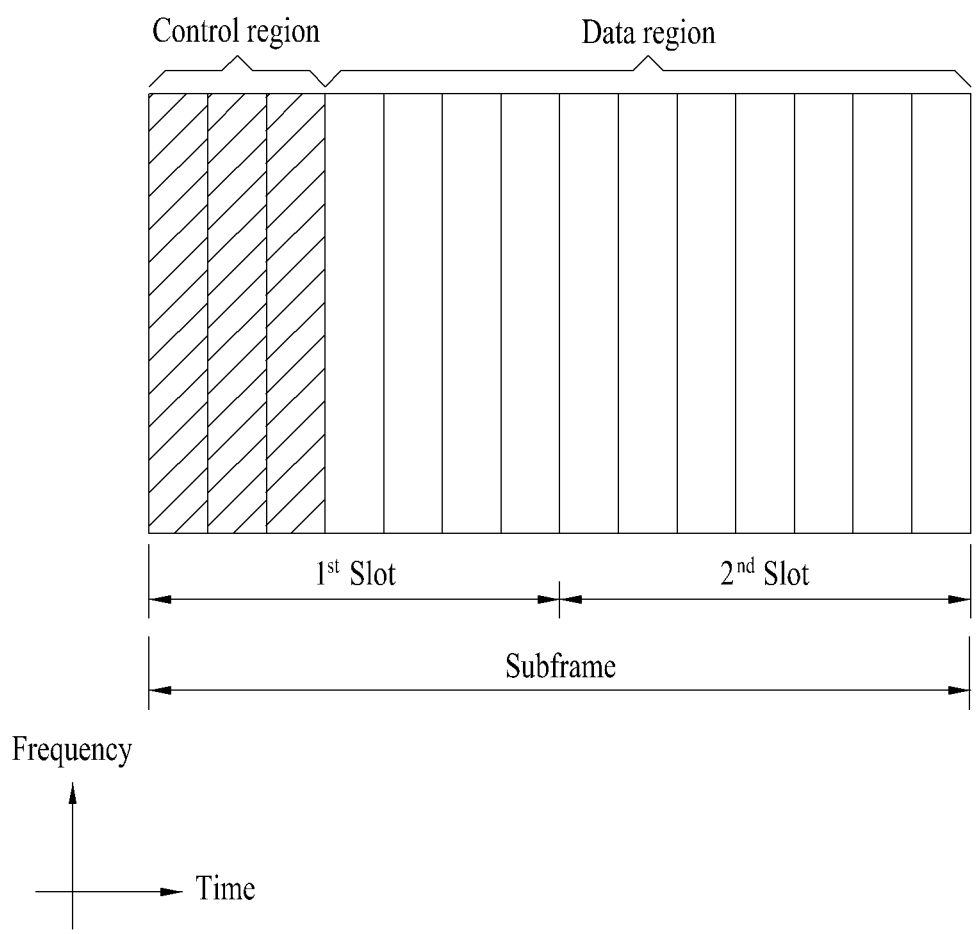
FIG. 4 illustrates a downlink subframe structure used in the present invention.

FIG. 4 illustrates a downlink subframe structure used in the present invention.

Referring to FIG. 4, a maximum of three (or four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

PCFICH is transmitted at the first (or starting) OFDM symbol of a subframe and carries information regarding the number of OFDM symbols used for transmission of control channels within the subframe. The PCFICH is composed of four resource element groups (REGs) that are uniformly distributed in a control region based on a cell ID. One REG may comprise 4 resource elements. The PCFICH indicates a value of 1 to 3 (or 2 to 4) and is modulated via quadrature phase shift keying (QPSK). The PHICH is a response of uplink transmission and carries an HARQ acknowledgment (ACK)/not-acknowledgment (NACK) signal. The PHICH except for CRS and PCFICH (a first OFDM symbol) is allocated on the remaining REGs in one or more OFDM symbols configured by PHICH duration. The PHICH is allocated to three REGs that are distributed if possible on the frequency domain. More detailed description regarding PHICH will be provided below in the present specification.

The PDCCH is allocated in first n OFDM symbols (hereinafter, a control region) of a subframe. Here, n is an integer equal to or greater than 1 and is indicated by the PCFICH. Control information transmitted through the PDCCH is referred to as downlink control information (DCI). A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC. When the PDCCH is for uplink power control, transmit power control-RNTI (TPC-RNTI) may be used, and the TPC-RNTI may include TPC-PUCCH-RNTI for PUCCH power control and TPC-PUSCH-RNTI for PUSCH power control. When the PDCCH is for multicast control channel (MCCH), multimedia broadcast multicast service-RNTI (M-RNTI) may be used.

Each PDCCH is transmitted using one or more control channel elements (CCEs) and each CCE corresponds to nine sets of four resource elements. The four resource elements are referred to as a resource element group (REG). Four QPSK symbols are mapped to one REG. A resource element allocated to a reference signal is not included in an REG and thus a total number of REGs in a given OFDM symbol varies according to whether a cell-specific reference signal is present.

Table 3 shows the number of CCEs, the number of REGs, and the number of PDCCH bits according to PDCCH format.

TABLE 3

| PDCCH format | Number of CCE (n) | Number of REG | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

Control information transmitted through the PDCCH is referred to as downlink control information (DCI). Various DCI formats are defined according to their usage. Specifically, DCI format 0, 4 (hereinafter, UL grant) are defined for uplink scheduling, and DCI formats 1, 1A, 1B, 1C, 1D, 2, 2A, 2B, 2C, and 2D (hereinafter, DL grant) are defined for downlink scheduling. DCI format optionally includes information about hopping flag, RB allocation, modulation coding scheme (MC S), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

A base station determines a PDCCH format according to control information to be transmitted to a UE, and attaches a cyclic redundancy check (CRC) to the control information for error detection. CRC is masked with an identifier (e.g. radio network temporary identifier (RNTI)) according to an owner or usage of the PDCCH. In other words, PDCCH is CRC-scrambled with an identifier (e.g. RNTI).

The LTE(-A) system defines a limited set of CCE positions in which a PDCCH is to be positioned for each UE. A limited set of CCE positions that a UE can find a PDCCH of the UE may be referred to as a search space (SS). In the LTE(-A) system, the SS has different sizes according to each PDCCH format. In addition, a UE-specific SS and a common SS are separately defined. The BS does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in an SS is referred to as blind decoding (blind detection). Through blind decoding, the UE simultaneously performs identification of the PDCCH transmitted to the UE and decoding of the control information transmitted through the corresponding PDCCH. For example, in the case where the PDCCH is de-masked using the C-RNTI, the UE detects its own PDCCH if a CRC error is not detected. The USS is separately configured for each UE and a scope of CSSs is known to all UEs. The USS and the CSS may be overlapped with each other. When a significantly small SS is present, if some CCE positions are allocated in an SS for a specific UE, the remaining CCEs are not present. Thus a BS may not find CCE resources in which the PDCCH is to be transmitted to all available UEs in a given subframe. In order to minimize the possibility that such blocking is subsequent to a next subframe, a start position of the USS is UE-specifically hopped.

Table 4 shows sizes of CSS and USS.

TABLE 4

| PDCCH format | Number of CCE (n) | Number of candidates in CSS | Number of candidates in USS |
| --- | --- | --- | --- |
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the UE-specific search space. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the UE-common search space. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier.

A PDSCH transmission scheme and information contents of DCI formats according to a transmission mode will be listed below.

Transmission Mode (TM)
Transmission Mode 1: Transmission from a single eNB antenna port
Transmission Mode 2: Transmit diversity
Transmission Mode 3: Open-loop spatial multiplexing
Transmission Mode 4: Closed-loop spatial multiplexing
Transmission Mode 5: Multi-user MIMO
Transmission Mode 6: Closed-loop rank-1 precoding
Transmission Mode 7: Single-antenna port (port 5) transmission
Transmission Mode 8: Dual layer transmission (ports 7 and 8) or single-antenna port (port 7 or 8) transmission
Transmission Modes 9 and 10: Layer transmission up to rank 8 (ports 7 to 14) or single-antenna port (port 7 or 8) transmission
DCI Format Format 0: Resource grant for PUSCH transmission Format 1: Resource allocation for single codeword PUSCH transmission (transmission modes 1, 2, and 7)

Format 1A: Compact signaling of resource allocation for single codeword PDSCH transmission (all modes)

Format 1B: Compact resource allocation for PDSCH (mode 6) using rank-1 closed-loop precoding Format 1C: Very compact resource allocation for PDSCH (e.g., paging/broadcast system information)

Format 1D: Compact resource allocation for PDSCH (mode 5) using multi-user MIMO

Format 2: Resource allocation for PDSCH (mode 4) of closed-loop MIMO operation

Format 2A: Resource allocation for PDSCH (mode 3) of open-loop MIMO operation

Format 3/3A: Power control command with 2-bit/1-bit power adjustments for PUCCH and PUSCH Format 4: Resource grant for PUSCH transmission (uplink) in a cell configured in a multi-antenna port transmission mode DCI formats may be classified as a TM-dedicated format and TM-common format. The TM-dedicated format indicates a DCI format configured only for the corresponding TM, and the TM-common format indicates a DCI format configured commonly for all TMs. For example, DCI format 2B may be a TM-dedicated DCI format for TM 8, DCI format 2C may be a TM-dedicated DCI format for TM 9, DCI format 2D may be a TM-dedicated DCI format for TM 10. Further, DCI format 1A may be a TM-common DCI format.

Figure 5:
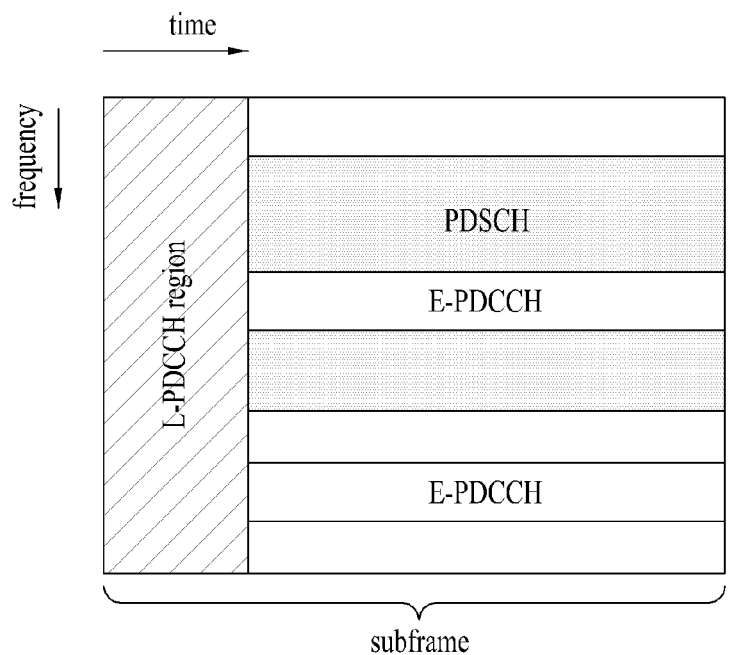
FIG. 5 illustrates an example of allocating an E-PDCCH in a subframe.

FIG. 5 illustrates an example of allocating an E-PDCCH in a subframe. In the conventional LTE system, PDCCH has a limitation of being transmitted in a limited number of symbols. Thus, in the LTE-A system, enhanced PDCCH (E-PDCCH) has been introduced for more flexible scheduling.

Referring to FIG. 5, a PDCCH (for convenience, legacy PDCCH or L-PDCCH) used in the conventional LTE(-A) system may be allocated to a control region of a subframe. An L-PDCCH region refers to a region to which the legacy PDCCH can be allocated. In the context, the L-PDCCH region may be referred to as a control region, a control channel resource region (i.e., a CCE resource) to which a PDCCH can be actually allocated, or a PDCCH search space. A PDCCH may be additionally allocated in a data region (e.g., a resource region for a PDSCH, refer to FIG. 4). The PDCCH allocated to the data region is referred to as an E-PDCCH. As illustrated, a channel resource may be additionally ensured through the E-PDCCH to alleviate scheduling restrictions due to limited control channel resource of an L-PDCCH region. The E-PDCCH and a PDSCH are multiplexed in a data region in the manner of frequency division multiplexing (FDM).

In detail, the E-PDCCH may be detected/demodulated based on a DM-RS. The E-PDCCH may be configured to be transmitted over a PRB pair on a time axis. When E-PDCCH based scheduling is configured, a subframe for transmission/detection of an E-PDCCH may be designated. The E-PDCCH may be configured in only a USS. The UE may attempt DCI detection only on an L-PDCCH CSS and an E-PDCCH USS in a subframe (hereinafter, an E-PDCCH subframe) in which E-PDCCH transmission/detection is configured and may attempt DCI detection on an L-PDCCH CSS and an L-PDCCH USS in a subframe (non-E-PDCCH subframe) in which transmission/detection of E-PDCCH is not allowed.

Like an L-PDCCH, an E-PDCCH carries DCI. For example, the E-PDCCH may carry DL scheduling information and UL scheduling information. An E-PDCCH/PDSCH procedure and an E-PDCCH/PUSCH procedure are the same/similar as described in steps S107 and S108 of FIG. 1. That is, a UE may receive the E-PDCCH and receive data/control information through a PDSCH corresponding to the E-PDCCH. In addition, the UE may receive the E-PDCCH and transmit data/control information through a PUSCH corresponding to the E-PDCCH. The conventional LTE system pre-reserves a PDCCH candidate region (hereinafter, a PDCCH search space) in a control region and transmits a PDCCH of a specific UE in a part of the PDCCH candidate region. Accordingly, the UE may acquire a PDCCH of the UE in the PDCCH search space via blind decoding. Similarly, the E-PDCCH may be transmitted over a part or entire portion of a pre-reserved resource.

Figure 6:
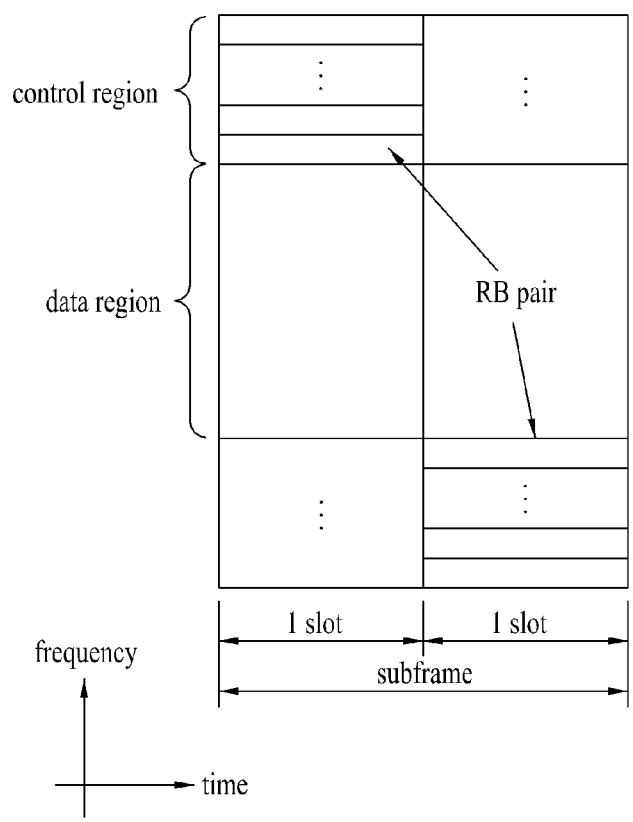
FIG. 6 illustrates an exemplary structure of an uplink subframe that may be used in LTE(-A) system.

FIG. 6 illustrates an exemplary structure of an uplink subframe that may be used in LTE(-A) system.

Referring to FIG. 6, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP. An uplink subframe is divided into a data region and a control region in a frequency domain. The data region includes a PUSCH, and is used to transmit a data signal that includes voice information. The control region includes a PUCCH, and is used to transmit uplink control information (UCI). The PUCCH includes RB pair (e.g. m=0, 1, 2, 3) located at both ends of the data region on a frequency axis, and performs hopping on the border of the slots.

The PUCCH may be used to transmit the following control information.

SR (Scheduling Request): information used to request uplink UL-SCH resource. The SR is transmitted using an on-off keying (OOK) scheme.

HARQ ACK/NACK: a response signal to the PDCCH indicating semi-persistent scheduling (SPS) release and a downlink data packet on the PDSCH. HARQ ACK/NACK represents whether the PDCCH indicating SPS release or the downlink data packet has been successfully received. ACK/NACK 1 bit is transmitted in response to a single downlink codeword (CW), and ACK/NACK 2 bits are transmitted in response to two downlink codewords.

CQI (Channel Quality Indicator): feedback information on a downlink channel. MIMO (Multiple Input Multiple Output) related feedback information includes a rank indicator (RI) and a precoding matrix indicator (PMI). 20 bits per subframe are used.

Figure 7:
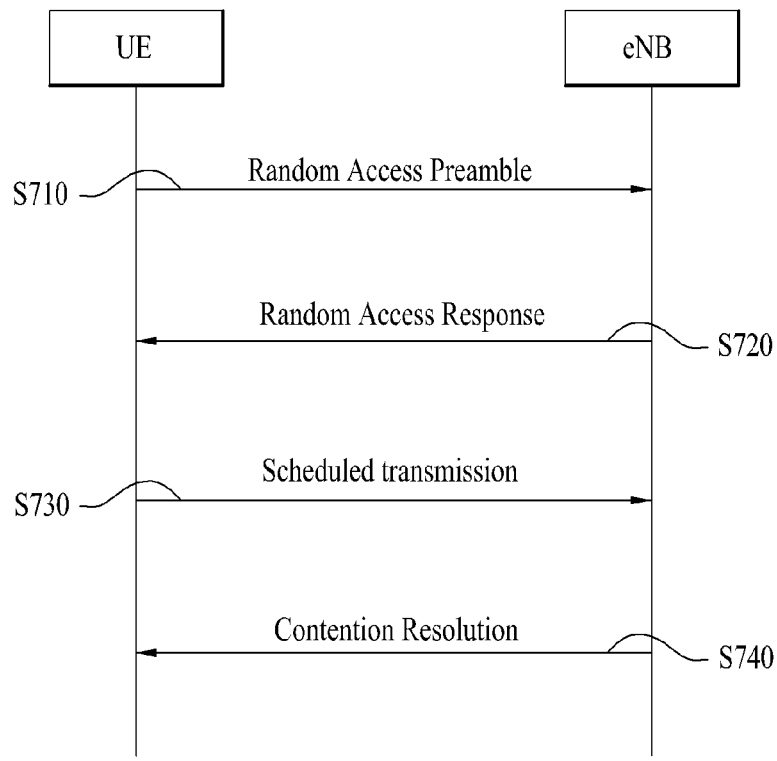
FIG. 7 illustrates a random access procedure.

FIG. 7 illustrates a random access procedure.

The random access procedure is used to transmit short-length data in uplink. For example, the random access procedure is performed upon initial access in an RRC_IDLE mode, upon initial access after radio link failure, upon handover requiring the random access procedure, and upon the occurrence of uplink/downlink data requiring the random access procedure during an RRC_CONNECTED mode. Some RRC messages such as an RRC connection request message, a cell update message, and a URA update message are transmitted using a random access procedure. Logical channels such as a Common Control Channel (CCCH), a Dedicated Control Channel (DCCH), or a Dedicated Traffic Channel (DTCH) can be mapped to a transport channel (RACH). The transport channel (RACH) can be mapped to a physical channel (e.g., Physical Random Access Channel (PRACH)). When a UE MAC layer instructs a UE physical layer to transmit a PRACH, the UE physical layer first selects an access slot and a signature and transmits a PRACH preamble in uplink. The random access procedure is divided into a contention-based procedure and a non-contention-based procedure.

With reference to FIG. 7, a UE receives and stores information regarding random access from an eNB through system information. Thereafter, when random access is needed, the UE transmits a random access preamble (referred to as Message 1) to the eNB (S710). Upon receiving the random access preamble from the UE, the eNB transmits a random access response message (referred to as Message 2) to the UE (S720). Specifically, downlink scheduling information for the random access response message may be CRC-masked with a Random Access-RNTI and may be transmitted through an L1/L2 control channel (PDCCH). Upon receiving the downlink scheduling signal masked with the RA-RNTI, the UE may receive and decode a random access response message from a Physical Downlink Shared Channel (PDSCH). Thereafter, the UE checks whether or not random access response information corresponding to the UE is present in the received random access response message. Whether or not random access response information corresponding to the UE is present can be determined based on whether or not a Random Access preamble ID (RAID) for the preamble that the UE has transmitted is present. The random access response information includes Timing Advance (TA) indicating timing offset information for synchronization, information of allocation of radio resources used in uplink, and a temporary identity (e.g., T-CRNTI) for user identification. Upon receiving the random access response information, the UE transmits an uplink message (referred to as Message 3) through an uplink Shared Channel (SCH) according to radio resource allocation information included in the response information (S730). After receiving the uplink message from the UE, the eNB transmits a message for contention resolution (referred to as Message 4) to the UE (S740).

In case of a non-contention based procedure, a base station may allocate a non-contention random access preamble to a UE before the UE transmits a random access preamble (S710). The non-contention random access preamble may be allocated through a dedicated signaling such as a handover command or PDCCH. In case that a UE is allocated with a non-contention random access preamble, the UE may transmit the allocated non-contention random access preamble to a base station in a similar manner as S710. If the base station receives the non-contention random access preamble from the UE, the base station may transmit a random access response (referred to as Message 2) to the UE in a similar manner as S720.

During the above-described random access procedure, HARQ may not be applied to a random access response (S720), but HARQ may be applied to an uplink transmission for the random access response or a message for contention resolution. Thus, the UE does not have to transmit ACK/NACK in response the random access response.

A next generation of LTE-A system is considering to configure a UE at a low cost/low specification mainly focusing on data communication such as metering of a gauge meter, measurement of a water level, utilization of a monitoring camera, inventory report of a vending machine, and the like. Such a UE is referred to as a machine type communication (MTC) UE or low complexity type UE for convenience. The MTC UE has a low data transmission amount and frequently transmits and receives data in uplink/downlink, and thus it is effective to reduce a cost of the device and battery consumption according to the low data transmission amount. The MTC UE has low mobility and thus a channel environment is rarely changed. In consideration of a poor situation in which the MTC UE is installed in a coverage-limited place such as a basement as well as a building and a factory, research has currently been conducted into various coverage enhancement schemes such as a repeated transmission method for a MTC UE for each channel/signal.

In the present specification, a UE according to a legacy LTE-A system may be referred to as a normal UE or a first type UE, and an MTC UE may be referred to as a second type UE or low complexity type (LCT) UE. Alternatively, a UE with a normal coverage (to which repetition is not applied) may be referred to as a first type UE, and a coverage-limited UE (to which repetition is applied) may be referred to as a second UE or an LCT UE. Alternatively, a UE to which repetition of the same signal/channel is not applied may be referred to as a first type UE, and a UE to which repetition is applied may be referred to as a second type UE or a coverage enhanced (CE) UE. For example, in the case of the LCT second type UE, the number of reception antennas may be reduced, the number of transport blocks (TBs) to be supported may be reduced, and a transmission and reception frequency range may be reduced. More specifically, the LCT second type UE may have one transmit antenna and one receive antenna, support only one TB, and support only a frequency range equal to or less than 6 resource blocks (RBs).

When a signal is transmitted in a coverage-limited environment, signal intensity may be weak as compared with noise. However, when the same signal/channel is repeatedly transmitted, the signal intensity may be continuously accumulated and may be increased, but noise has random properties and thus noise may be counter-balanced so as to be maintained at a predetermined level. Accordingly, coverage may be enhanced via repeated transmission of the same signal in a coverage-limited environment.

In consideration of coverage enhancement in a random access procedure, (time domain) repetition may also be applied to a PRACH preamble transmission and a signal/channel transmitted in association with the PRACH preamble transmission, i.e. for example, a random access response (RAR), PUSCH (or Msg3) scheduled from the RAR, and the like. Accordingly, for repeated transmitting operation, a number of times of applying/performing repetition need to be signaled/configured using a predetermined resource (e.g., code/time/frequency) for each signal/channel prior to corresponding signal/channel transmission. In addition, in consideration of application of repetition to a PRACH preamble and/or RAR and/or a PDCCH for scheduling the corresponding RAR, it is necessary to consider a method for determining a RA-RNTI and an interval at which RAR can be received (and/or RA-RNTI can be detected). In this specification, the interval at which RAR can be received (and/or RA-RNTI can be detected) will be referred to as an RAR window.

The present invention proposes a method for signaling/configuring information and a parameter involved in a random access procedure based on repeated transmission for coverage enhancement of a LCT second type UE. In this specification, a PRACH resource may refer to a combination of a sequence/subframe (SF)/frequency band, etc. used in PRACH preamble transmission. In addition, in the specification, a signal/channel repeated transmission duration corresponding to one repetition number of times for repeated transmission of the same signal may be referred to as "bundle" or "bundle interval" for convenience. A repetition number of times for each signal/channel may be independently configured for coverage enhancement, and the repetition number of times may include "1". When a repetition number of times is 1, this means one-time transmission without repetition and in this case, a bundle interval may be one subframe. In addition, the PDCCH described in the present invention may include both a PDCCH and an EPDCCH, and the CCE may include both a CCE and an ECCE. In the specification, the repeated transmission may be simply referred to as repetition. Prior to the description, several terms associated with a random access procedure will be summarized below.

1) PRACH: PRACH preamble transmitted using a combination of a specific sequence/SF/frequency band (UE to eNB)

A. A repetition number of times of PRACH is defined as Np for convenience.

B. In the case of PRACH repetition, a method for applying a repetition number of times Np to an entire preamble format or applying a repetition number of times Np only to a part of sequence within a preamble may be considered.

2) RAR: PDSCH for transmitting a PRACH preamble response message including timing advance (TA), etc. (eNB to UE)

RAR-PDCCH: PDCCH for transmitting DL grant for RAR (eNB to UE)

A. A repetition number of times of RAR and RAR-PDCCH are defined as Nr and Nd, respectively.

3) Msg3: PUSCH transmitted based on UL grant included in RAR (UE to eNB)

A. A repetition number of times of Msg3 is defined as Nm

Figure 8:
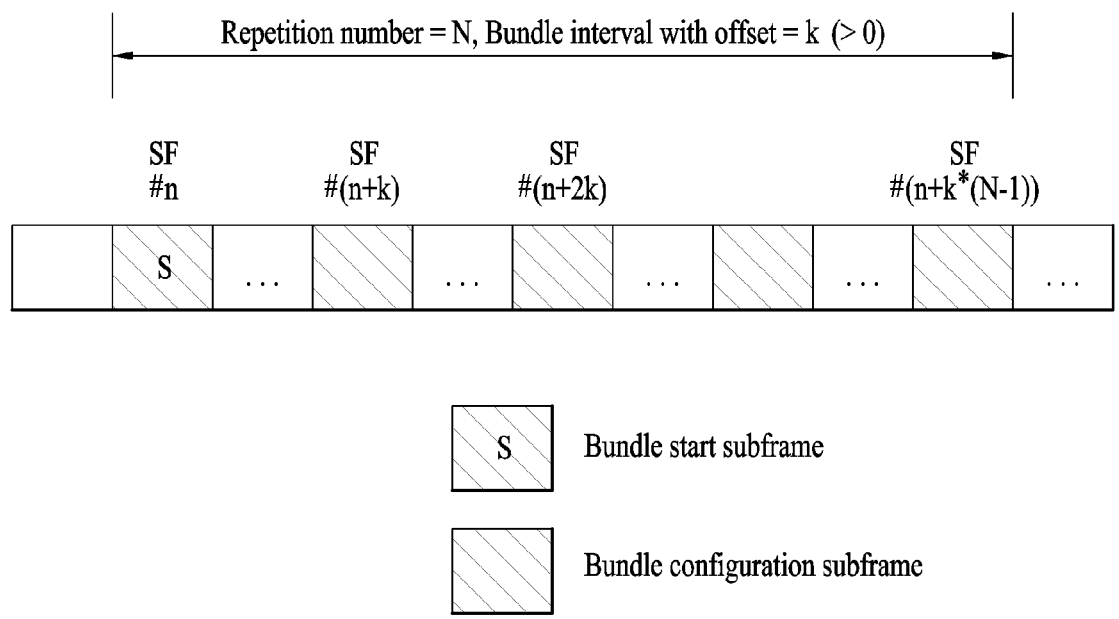
FIG. 8 illustrates a bundle interval according to the present invention.

FIG. 8 illustrates a bundle interval according to the present invention.

Referring to FIG. 8, the same channel/signal may be transmitted and received once in one subframe and transmitted and received with a specific offset a total of N repetition numbers over N (>0) subframes. In this case, a subframe in which a channel/signal is initially transmitted and received may be referred to as a bundle start subframe S (refer to FIG. 8), a subframe in which a channel/signal is lastly transmitted and received may be referred to as a bundle end subframe, and an interval to the bundle end subframe from the bundle start subframe may be referred to as a bundle or a bundle interval. In addition, a subframe in which a channel/signal is transmitted and received in a bundle or a bundle interval may be referred to as a bundle configuration subframe. Accordingly, the same channel/signal may be transmitted and received every bundle configuration subframe from the bundle start subframe S (refer to FIG. 8). In addition, subframes constituting the bundle interval may each be configured with a specific offset k. For example, when the specific offset k is 1, the bundle interval may be configured with N consecutive subframes. In the present specification, for convenience of description, it may be assumed that the bundle interval includes consecutive subframes, but the present invention may also be applied to the case, in which an offset has a value equal to or greater than 1, in the same manner.

RAR Transmission Related Information

In general, RAR transmission may be scheduled by an RAR-PDCCH (e.g., refer to FIG. 7). Accordingly, in a general case, the RAR transmission related information (briefly referred to as RAR-info) may include all or part of the following information items. Below, an RAR-PDCCH repetition number of times Nd, RAR-PDCCH bundle configuration/start SF information, control channel resource information for transmitting an RAR-PDCCH, and/or CFI information may be referred to as RAR-PDCCH transmission related information.

RAR repetition number of times Nr

RAR bundle configuration/start SF information

Information on OFDM symbol in which RAR transmission is started

RAR-PDCCH repetition number of times Nd

RAR-PDCCH bundle configuration/start SF information

Information on a control channel resource (e.g., PDCCH candidate and/or CCE index) for transmitting RAR-PDCCH and control format indicator (CFI) information (i.e., OFDM symbol number/interval used/assumed for transmitting a control channel of a PDCCH, etc.)

RAR transmission related information (RAR-info) may be signaled/configured via (specific) SIB. The corresponding (specific) SIB may be a legacy SIB that can also be received by normal UEs or a new LCT second-type-dedicated SIB that can be received by all or only specific second type UEs. The legacy SIB may refer to SIB specified in the LTE-A, and when RAR transmission related information is signaled via the legacy SIB, the RAR transmission related information may be signaled to be additionally included in the legacy SIB. When the RAR transmission related information is signaled via the LCT second-type-dedicated SIB, the RAR transmission related information may be included in, for example, SIB that can be received by only LCT second type UEs that require coverage enhancement.

In addition, RAR transmission related information may be defined for respective coverage enhancement requirements in the form of a look-up table. In this case, the LCT second type UE may perform an RAR transmission related operation based on the look-up table with reference to information corresponding to a coverage condition of the LCT second type UE in the look-up table without an additional separate signaling/configuring procedure.

In addition, repetition related information about an arbitrary PDCCH transmitted through a common search space (CSS) (or based on UE-common RNTI) may be signaled/configured via (specific) SIB (or RAR or UE-specific RRC signaling) with included in RAR-info or irrespective of RAR-info. Repetition related information about an arbitrary PDCCH transmitted via a common search space (CSS) (or based on UE-common RNTI) may be signaled/configured with including RAR-PDCCH repetition related information or irrespective of RAR-PDCCH repetition related information. The UE-common RNTI may include, for example, SI-RNTI, P-RNTI, RA-RNTI, TPC-PUCCH-RNTI, TPC-PUSCH-RNTI, or M-RNTI. Repetition related information about CSS (or UE-common RNTI) based PDCCH may refer to, for example, all or part of PDCCH repetition number of times and PDCCH bundle configuration/start SF information, control channel resource information for transmitting PDCCH, CFI information, etc.

In addition, the CSS (or UE-common RNTI) based PDCCH repetition related information may include PDSCH/PUSCH repetition related information scheduled from the CSS (or UE-common RNTI) based PDCCH. For example, PDSCH/PUSCH repetition related information scheduled from the CSS (or UE-common RNTI) based PDCCH may include all or part of PDSCH/PUSCH repetition number of times and PDSCH/PUSCH bundle configuration/start SF information, PDSCH transmission start OFDM symbol information, whether PHICH transmission is present, PHICH repetition related information, whether HARQ-ACK is transmitted, HARQ-ACK repetition related information, etc. In addition, for example, the PHICH repetition related information may include all or part of PHICH repetition number of times and PHICH bundle configuration/start SF information, PHICH resource allocation information corresponding thereto, and the like. For example, the HARQ-ACK repetition related information may include all or part of HARQ-ACK repetition number of times and HARQ-ACK bundle configuration/start SF information, resource allocation information corresponding thereto, and the like.

CSS (or UE-common RNTI) based PDCCH repetition related information (and PDSCH/PUSCH repetition related information corresponding thereto) may be independently configured for each DCI format type/use and/or DCI payload size. For example, independent repetition related information may be configured from DCI format 0/1A and DCI format 3/3A and DCI format 1C according to a DCI format type/use or independent repetition related information may be configured for DCI format 0/1A/3/3A and DCI format 1C according to a DCI payload size. In addition, CSS (or UE-common RNTI) based PDCCH repetition related information (and PDSCH/PUSCH repetition related information corresponding thereto) may be independently configured for each RNTI type and/or use. For example, independent repetition related information may be configured for UE-common RNTI and UE-specific RNTI, or independent repetition related information may be configured for UE-specific RNTI and TPC-PUCCH/PUSCH-RNTI and RA/SI/P-RNTI (or RA-RNTI and SUP-RNTI).

As another method, in order to reduce overhead and latency involved in control signaling, a method for (applying repetition and) transmitting only RAR without RAR-PDCCH transmission may be considered. In this case, (except for RAR-PDCCH repetition related information) (all or part of) RAR repetition number of times Nr and RAR bundle configuration/start SF information, information about an OFDM symbol in which RAR transmission is started, RAR scheduling information (e.g., MCS level and/or TB size), and the like as well as RB resources allocated to RAR transmission may be included in RAR-info and may be signaled/configured via (specific) SIB.

On the other hand, a method for (applying repetition and) transmitting only RAR-PDCCH without transmission of RAR (PDSCH including the same) may also be considered. In this case, the UE may operate while considering the corresponding RAR-PDCCH as RAR. In this case, (except for RAR transmission related information) (all or part of) RAR-PDCCH repetition number of times Nd and RAR-PDCCH bundle configuration/start SF information, information about a control channel resource for transmitting RAR-PDCCH, CFI information, and the like may be included in RAR-info and may be signaled/configured via (specific) SIB. In this case, all or part of RAR related content (e.g., timing advance (TA), temporary-C-RNTI, and UL grant for Msg3) may be included in a specific field (combination) constituting RAR-PDCCH. Alternatively, UL grant (and/or temporary-C-RNTI) for Msg3 may be may be preconfigured via (specific) SIB.

According to an embodiment of the present invention, a PRACH resource or a PRACH resource set may be allocated to correspond to different coverage enhancement requirements and corresponding RAR transmission related information (RAR-info) may be differently (or independently) configured for each PRACH resource or PRACH resource set. For example, coverage enhancement requirements may be defined as measured path-loss and/or required signal-to-noise ratio (SNR)/signal-to-interference plus noise ratio (SINR). A UE may select/transmit a specific PRACH resource according to a coverage condition (e.g., a measured path-loss value or coverage enhancement requirements calculated based thereon (e.g., SNR or SINR)) of the UE and then perform an RAR detection/reception operation appropriate for RAR transmission related information (RAR-info) set/associated with a corresponding specific PRACH resource.

The PDSCH and/or PDCCH transmission related information may also be signaled/configured in the same/similar way (e.g., for each PRACH resource (set) and/or coverage enhancement requirements). The PDSCH and/or PDCCH transmission related information may be signaled/configured by generalizing RAR transmission related information (RAR-info) or irrespective of RAR transmission related information (RAR-info). For example, the PDSCH and/or PDCCH transmission related information may include all or part of PDSCH repetition number of times and PDSCH bundle configuration/start SF information, PDSCH start OFDM symbol information, PDCCH repetition number of times and PDCCH bundle configuration/start SF information, PDCCH transmission control channel resource and CFI information (including information on whether PCFICH reception is performed or skipped), PDSCH scheduling information (e.g., MCS level and/or TB size) (when a PDSCH is repeatedly transmitted without corresponding PDCCH transmission), information about whether HARQ-ACK for PDSCH reception is transmitted and/or HARQ-ACK repetition number of times/bundle information. In addition, for example, the UE may perform a PDSCH/PDCCH receiving operation appropriate for the PDSCH/PDCCH transmission related information corresponding to a coverage condition of the UE based on the PDSCH/PDCCH transmission related information.

During a detection/receiving operation of a primary synchronization signal (PSS)/secondary synchronization signal (SSS) and/or physical broadcast channel (PBCH), when the UE determines that there is a problem in coverage (e.g., measured path-loss and required S(I)NR) of the UE, CFI information to be assumed (e.g., for PDCCH detection/reception, etc.) by the UE needs to be pre-defined until the UE receives signaling for actual CFI information configuration from an eNB. The case in which the UE determines that there is a problem in coverage of the UE may include, for example, the case in which combining/acquisition time of reception for PSS/SSS detection is relatively increased compared with a general legacy UE and/or the case in which a master information block (MIB) can be detected by only receiving a PBCH bundle including an additional repeated PBCH as well as a legacy PBCH.

Accordingly, the present invention proposes that a UE (skips a detection/reception operation and) operates while assuming/considering one specific CFI value irrespective of a system bandwidth (BW) or a greatest CFI value defined in a BW of a system that the UE accesses until receiving signaling for actual CFI information configuration from the eNB in a coverage-limited situation. For example, the UE may operate while assuming/considering a (as small as possible) PDSCH start OFDM symbol index when the corresponding CFI values is assumed. In addition, the UE may operate while assuming/considering that PDSCH mapping starts from a symbol that immediately succeeds a control channel symbol duration corresponding to the greatest CFI value or a specific CFI value until receiving signaling for actual PDSCH start OFDM symbol information configuration from the eNB. In addition, the UE may skip a HARQ-ACK transmitting operation for PDSCH reception until receiving signaling for actual HARQ-ACK feedback related information configuration from the eNB.

As another method, the UE may operate while assuming/considering a greatest CFI value (according to a system bandwidth (BW)) or a specific CFI value (irrespective of a system bandwidth (BW)) with respect to a PDSCH (referred to as "UE-common PDSCH") for transmitting UE-common data and operate while assuming/considering a different CFI value from the CFI value corresponding to the UE-common PDSCH with respect to PDSCH (referred to as "UE-specific PDSCH") for transmitting UE-specific data or signal/set separate independent CFI information (and/or PDSCH start symbol information) with respect to only the corresponding UE-specific PDSCH. The UE-common PDSCH may include, for example, SIB and/or paging and/or RAR, etc. For example, the UE may operate while assuming/considering a (as small as possible) PDSCH start OFDM symbol index when the corresponding CFI value is assumed.

The CFI information (and/or PDSCH start symbol information) may be signaled/configured via a PBCH, SIB, RAR, or Msg4 or may be UE-commonly signaled/configured through a separate specific broadcast signal/channel (transmitted with a predetermined duration).

Msg3 Transmission Related Information

The Msg3 transmission related information may include all or part of the following information items. The Msg3 transmission related information may be referred to as Msg3-info.

Msg3 repetition number of times Nm

Msg3 bundle configuration/start SF information

Whether a PHICH is transmitted in response to Msg3 reception. When PHICH transmission is configured to be skipped, PHICH based non-adaptive automatic retransmission may not be permitted and only UL grant-based adaptive retransmission (adaptive retransmission may be permitted.

PHICH repetition number of times/bundle information

The Msg3 transmission related information (Msg3-info) may be signaled/configured via (specific) SIB or RAR. Alternatively, as in the case of RAR transmission related information (RAR-info), the above information items may be defined in the form of a look-up table for each coverage enhancement requirement. In this case, a LCT second type UE may perform a Msg3 transmission related operation based on information appropriate for a coverage condition of the UE with reference to the information in the look-up table without a separate additional signaling/configuring procedure.

Start SF timing of Msg3 bundle transmission may be determined based on start or end SF timing of RAR (or PDCCH corresponding thereto) bundle transmission. For example, the start SF timing of Msg3 bundle transmission may be determined as SF timing obtained by adding a specific SF offset to the start or end SF timing of the RAR (or PDCCH corresponding thereto) bundle transmission. The specific SF offset may be, for example, signaled/set while included in the Msg3 transmission related information (Msg3-info) or may be pre-defined as a specific value.

In addition, for transmission UL grant for scheduling retransmission of Msg3 and/or DL grant for scheduling a specific PDSCH (referred to as "Msg4") transmitted for contention resolution for Msg3, a PDCCH may be repeatedly transmitted through a specific UE-search space (USS) (or based on UE-specific RNTI). The UE-specific RNTI may include, for example, temporary C-RNTI, C-RNTI, and SPS C-RNTI. Repetition related information about a USS (or UE-specific RNTI) based PDCCH may be signaled/set via (specific) SIB or RAR (or UE-specific RRC signaling) while included in the Msg3 transmission related information (Msg3-info) or irrespective of Msg3 transmission related information (Msg3-info). Alternatively, the repetition related information about the USS (or UE-specific RNTI) based PDCCH may be independently signaled/configured CSS (or UE-common RNTI) based PDCCH repetition related information (and PDSCH/PUSCH repetition related information corresponding thereto). The repetition related information for the USS (or UE-specific RNTI) based PDCCH may refer to all or part of PDCCH repetition number of times and PDCCH bundle configuration/start SF information, information of control channel resource for transmitting a PDCCH, CFI information, etc.

In addition, the USS (or UE-specific RNTI) based PDCCH repetition related information may include PDSCH/PUSCH repetition related information scheduled from a USS (or UE-specific RNTI) based PDCCH. For example, the PDSCH/PUSCH repetition related information may include all or part of PDSCH/PUSCH repetition number of times and PDSCH/PUSCH bundle configuration/start SF information, PDSCH transmission start OFDM symbol information, information about whether a PHICH is transmitted and PHICH repetition related information, information about whether HARQ-ACK is transmitted, HARQ-ACK repetition related information, etc. For example, the PHICH repetition related information may include all or part of PHICH repetition number of times and PHICH bundle configuration/start SF information, PHICH resource allocation information corresponding thereto, etc. In addition, for example, the HARQ-ACK repetition related information may include all or part of HARQ-ACK repetition number of times and HARQ-ACK bundle configuration/start SF information, PUCCH resource allocation information corresponding thereto, etc.

The USS (or UE-specific RNTI) based PDCCH repetition related information (and corresponding PDSCH/PUSCH repetition related information) may also be independently configured for each DCI format type or DCI payload size. For example, independent repetition related information may be configured for TM-common DCI format (e.g., DCI format 0/1A) and DL TM-dedicated DCI format (e.g., DCI format 1/1B/1D/2/2A/2B/2C/2D) and UL TM-dedicated DCI format (e.g., DCI format 4).

In addition, as described above, the PRACH resource or the PRACH resource set may be allocated to correspond to different coverage enhancement requirements (e.g., measured path-loss or required SNR/SINR), and corresponding Msg3 transmission related information (Msg3-info) may be differently (or independently) configured for the PRACH resource or the PRACH resource set. The UE may select/transmit a specific PRACH resource according to a coverage condition of the UE and then perform a Msg3 transmitting operation and a PHICH receiving operation corresponding thereto appropriate to Msg3 transmission related information (Msg3-info) that is configured/associated with the corresponding specific PRACH resource.

The PUSCH transmission related information may be signaled/configured in the same/similar way (e.g., for each PRACH resource (set) and/or coverage enhancement requirement) by generalizing Msg3-info or irrespective of Msg3-info. For example, the UE may perform a PUSCH transmitting operation appropriate for PUSCH transmission related information corresponding to a coverage condition of the UE with reference to the PUSCH transmission related information. The PUSCH transmission related information may include all or part of, for example, PUSCH repetition number of times and PUSCH bundle configuration/start SF information, information about whether a PHICH is transmitted, and/or PHICH repetition number of times/bundle information.

Similarly to the above description, the UE may skip (a detection/reception operation of a PHICH and) a PHICH based non-adaptive automatic retransmitting operation and perform only UL grant based adaptive retransmission until receiving signaling for actual PHICH transmission related information setting in a coverage-limited situation.

Method for Configuring RAR Window

In a legacy system (e.g., LTE-A system), a start subframe (SF) of an RAR window may be determined as SF timing obtained by adding a specific SF offset (e.g., three subframes) to SF timing at which PRACH preamble transmission ends. A size of the RAR window may be configured as a value signaled via SIB and may be, for example, 2, 3, 4, 5, 6, 7, 8, or 10 subframes. The RAR window size may be defined as Nw. Accordingly, when repetition is applied to PRACH and/or RAR-PDCCH and/or RAR transmission, start SF and size of an RAR window corresponding thereto needs to be determined in consideration of a repetition number of times and/or a bundle interval of each channel. When a bundle of a specific channel does not include consecutive SFs, a bundle interval (or the number of SFs in a bundle) may be greater than a repetition number of times.

First, an RAR window start SF may be determined based on SF timing at which last PRACH preamble transmission of a PRACH bundle ends. For example, the RAR window start SF may be determined as SF timing (this is assumed as SF #K) obtained by adding a specific SF (e.g., 3 SFs) to a last PRACH preamble transmission subframe of a PRACH bundle. As another example, the RAR window start SF may be determined as closest (available) RAR-PDCCH bundle start SF timing (or closest (available) RAR bundle start SF timing) after the corresponding SF #K including SF #K.

The RAR window size may be determined based on an entire interval (which is defined as Ba) in which an RAR-PDCCH bundle and an RAR bundle corresponding thereto can be transmitted. An entire duration (Ba) corresponding to the RAR window size may correspond to a corresponding SF duration from initial RAR-PDCCH transmission time (of an RAR-PDCCH bundle) to last RAR transmission time (of an RAR bundle corresponding thereto) and may refer to (Nd+Nr) SF durations. For example, Ba may have a form of max(Nd, Nr)+a1 or Nd+Nr+a2, and in this case, max(Nd, Nr) may refer to a greatest value of Nd and Nr, a1 may refer to a positive integer in addition to 0, and a2 may refer to a positive integer in addition to −1 and 0. As another example, the final RAR window size may be determined based on a value obtained by adding Nw signaled via SIB to Ba or a value obtained by multiplying Ba by Nw signaled via SIB or determined based on a duration including Nw (available) Ba.

Alternatively, the RAR window size may be determined based on an RAR-PDCCH bundle transmission duration (which is defined as Bd) and an RAR bundle transmission duration (which is defined as Br). The RAR-PDCCH bundle transmission duration Bd may refer to a corresponding SF duration from initial RAR-PDCCH transmission time corresponding to one RAR-PDCCH bundle to last RAR-PDCCH transmission time, and refer to, for example, (Nd+b) SF durations where b is a positive integer in addition to 0. The RAR bundle transmission duration Br may refer to a corresponding SF duration from initial RAR (PDSCH) transmission time corresponding to one RAR bundle to last RAR (PDSCH) transmission time and refer to, for example, (Nr+b) SF durations. As another example, the last RAR window size may be determined based on a value (Bd×Nw+Br) obtained by multiplying Bd by Nw and adding Br to the resultant value or determined based on a value (Bw+Br+a where a is an integer equal to or greater than 0) obtained by adding an RAR bundle interval Br corresponding to a last RAR-PDCCH bundle to a duration (defined as Bw) including Nw (available) Bd.

As another method, similarly to the above description, a separate/independent RAR window size (or a specific parameter value used to determine the same) may be configured for each respective PRACH resource or PRACH resource set, and the RAR window size (or a specific parameter value used to determine the same) may be signaled/configured ((specific) SIB) while included in RAR-info.

The case in which multiplexing (e.g., code division multiplexing (CDM) and/or time division multiplexing (TDM) and/or frequency division multiplexing (FDM)) is applied between PRACH transmission of a normal-coverage UE (to which repetition is not applied) and PRACH bundle transmission of a coverage-limited UE (to which repletion is applied) and/or between PRACH bundle transmission with different repetitions may be considered. In this case, (in order to differentiate PRACH signals from a plurality of UEs to be overlapped) a repetition number of times Np corresponding to a PRACH (bundle) signal transmitted from the UE (i.e., received from an eNB) may be transmitted/signaled while included in RAR (or RAR-PDCCH), and/or, time and/or frequency resource information associated with corresponding PRACH (bundle) signal transmission may be transmitted/signaled while included in RAR (or RAR-PDCCH). For example, the time and/or frequency resource information associated with the PRACH (bundle) signal transmission may include start/configuration SF (timing) information (and/or SFN information corresponding thereto) of the PRACH bundle signal and/or frequency band information (e.g., index in the frequency domain) for transmitting a PRACH signal, etc.

FIG. 9 is a diagram illustrating an example of a method according to the present invention.

Referring to FIG. 9, a UE may transmit a PRACH signal using a specific PRACH resource in operation S902. As described above, the PRACH resource may refer to a combination of sequence/subframe SF/frequency band, etc. used to transmit a PRACH preamble. In addition, a PRACH resource or a PRACH resource set may be allocated to correspond to different coverage enhancement requirements, and the UE may select a specific PRACH and transmit a PRACH signal according to a coverage condition (e.g., measured path-loss value or coverage enhancement requirements (e.g., SNR or SINR) calculated based thereon) of the UE. For example, the PRACH signal may be allocated to a PRACH preamble.

In operation S904, the UE may receive an RAR signal in a specific time period (e.g., RAR window) in response to the PRACH signal transmitted in operation S902. When the UE is a first type UE (or a normal-coverage UE or a UE to which repetition is not applied), the UE may receive an RAR signal at subframe timing obtained by adding a specific SF offset (e.g., 3) to a subframe in which the PRACH signal is transmitted in operation S902. In this case, the RAR window size may be configured as a value signaled via SIB and may be, for example, 2, 3, 4, 5, 6, 7, 8, or 10 subframes.

On the other hand, when the UE is a second type UE (or an LCT UE, a UE with a limited coverage, or a UE to which repetition is applied), the UE may repeatedly transmit a PRACH signal during a PRACH bundle and may receive/detect an RAR signal in a duration corresponding to the RAR window size in the RAR window start SF according to the present invention. In this case, the RAR window start SF may be determined as subframe timing obtained by adding a specific subframe offset (e.g., 3) to a last PRACH signal transmission subframe of a PRACH bundle or determined as closest RAR-PDCCH bundle start SF timing (or closest RAR bundle start SF timing) after the determined subframe.

When the UE is a second type UE, the RAR window size may be determined based on an entire duration (which is defined as Ba) in which an RAR-PDCCH bundle and an RAR bundle corresponding thereto can be transmitted (e.g., max(Nd, Nr)+a1 or Nd+Nr+a2) or determined as RAR-PDCCH bundle transmission duration (which is defined as Bd) and an RAR bundle transmission duration (which is defined as Br) (e.g., Bd×Nw+Br or Bw+Br+a).

In consideration of multiplexing applied between PRACH transmission of a first type UE and a second type UE or PRACH transmission of a second type UE, the RAR signal received in operation S904 may include information about a repeated transmission number of times Np of the PRACH signal transmitted in operation S902. Additionally or separately, the RAR signal of operation S904 may include time and/or frequency resource information associated with PRACH signal transmission of operation S902. The UE may differentiate PRACH signals from a plurality of UEs to be overlapped using these information items.

Although not illustrated in FIG. 9, the UE may receive downlink control information (or a PDCCH signal) for scheduling the RAR signal. In this case, the downlink control information (or a PDCCH signal) may be masked (or scrambled) with RA-RNTI information. Hereinafter, a method for determining RA-RNTI information will be described.

Method for Determining RA-RNTI

In a legacy system (e.g., a LTE-A system), an RA-RNTI value may be determined according to a function of SF timing (which is defined as T_id) in which PRACH preamble transmission is started and an index (which is defined as F_id) on the frequency domain of the corresponding PRACH preamble. For example, the RA-RNTI value may be determined according to RA-RNTI=1+T_id+10×F_id. Accordingly, when repetition is applied to PRACH transmission, an RA-RNTI value corresponding thereto needs to be determined in consideration of a repetition number of times of a PRACH and/or a bundle interval.

When repetition is applied to PRACH transmission, T_id may be determined as SF timing in which initial PRACH preamble transmission of a PRACH bundle is started or SF timing in which last PRACH preamble transmission ends. F_id may be determined as an index in the frequency domain of a PRACH preamble (i.e., an initial or last PRACH preamble of a PRACH bundle) transmitted through the corresponding T_id. In addition, a method for determining an RA-RNTI value according to a PRACH repetition number of times Np (in addition to T_id and F_id). Accordingly, according to the present invention, the RA-RNTI value may be determined according to a function of Np. In more detail, when PRACH preamble transmission related information (e.g., PRACH transmission SF timing T_id and/or index F_id in the frequency domain) is the same, the RA-RNTI value be differently determined according to a value Np.

In addition, when a situation in which respective PRACH resource (sets) coexist/contend with each other based on different (various) transmission timing and repetition number of times is considered, it may not be easy to differentiate an RA-RNTI according to T_id and/or F_id (in particular, T_id). Accordingly, when repetition is applied to PRACH transmission, T_id (and/or F_id) may be determined/configured as not being used to determine the RA-RNTI value.

When PRACH bundle transmission (e.g., a PRACH preamble is repeatedly transmitted) is applied, timing in which (initial) PRACH preamble transmission is started may be configured using a system frame number (SFN) (and/or PRACH repetition number of times Np or a subframe duration including one PRACH repetition (e.g., a duration from a subframe in which an initial PRACH preamble is transmitted to a subframe in which a last PRACH preamble is transmitted)) and an SF number/index as a parameter by considering that a PRACH transmission duration is extended (over a plurality of radio frames) due to repetition. For example, timing at which transmission of a specific PRACH preamble bundle is started may be configured as SFN #N (and a specific SF number/index in the corresponding SFN), and timing at which transmission of another PRACH preamble bundle is started may be configured as SFN #M (and a specific SF number/index in the corresponding SFN) different from SFN #N. In addition, an RA-RNTI (or T_id for determining the same) value may also be determined according to a function of an SFN (and/or an SF number/index) corresponding to a time point at which (initial or last) PRACH preamble transmission is started/ended in consideration of a PRACH bundle transmission duration (which is extended over a plurality of radio frames).

In addition, in consideration of the case in which code division multiplexing (CDM) is applied between PRACH transmission of a normal-coverage UE (to which repetition is not applied) and PRACH bundle transmission of a coverage-limited UE (to which is applied) and/or between PRACH bundle transmission with different repetitions, an RA-RNTI value may be determined according to a function of a root sequence index (or a combination of a root sequence index and a cyclic shift value) of a PRACH signal corresponding to the RA-RNTI value.

As another method, an independent dedicated RA-RNTI value may be determined/configured for each PRACH resource or PRACH resource set. Accordingly, the RA-RNTI value may be pre-determined (irrespective of a T_id and/or F_id value) without the above separate calculation procedure. The independent dedicated RA-RNTI value may be signaled/configured (via (specific) SIB) for each PRACH resource or PRACH resource set while included in RAR-info.

PRACH Transmission for Scheduling Request

In a legacy system (e.g., LTE-A system), when a scheduling request (SR) is present, if a PUCCH resource for SR use is pre-allocated, a UE may transmit a (positive) SR signal using the corresponding PUCCH resource, or otherwise, the UE may select and transmit an arbitrary PRACH preamble to perform scheduling request. In a coverage-limited environment (or a situation in which various UL channel/signals including a PRACH are repeatedly transmitted), assuming that a separate PUCCH resource for SR use is not allocated to the UE, if scheduling request is present, the corresponding UE may select and transmit an arbitrary PRACH resource (by as much as a repetition number of times corresponding to the corresponding PRACH resource) similarly to a legacy case among a plurality of PRACH resource (sets) with different repetition numbers. However, 1) when performance of the selected PRACH resource (repetition corresponding thereto) is lower than coverage enhancement requirements required for a corresponding UE, additional PRACH retransmission may required, and 2) when performance of the selected PRACH resource (repetition corresponding thereto) is much higher than the coverage enhancement requirements required for the corresponding UE, many PRACH resources may be unnecessarily consumed, thereby causing unnecessary overhead and/or interference in terms of use of UL resource.

Accordingly, in a coverage-limited situation, when the UE selects/transmits a (repetition based) PRACH for use of scheduling request, a PRACH resource may be selected as follows.

A PRACH resource corresponding to RAR that is successfully received among PRACH resources that have been selected/transmitted by the corresponding UE in an initial random access procedure (or (contention-based) random access procedure) that has been most recently (lastly) performed, or An arbitrary PRACH resource set with the same repetition number of times as a PRACH resource corresponding to RAR that is successfully received, or An arbitrary PRACH resource set with a smallest repetition number of times greater than a corresponding repetition number of times (or a greatest repetition number of times less than the corresponding repetition number of times) (when a PRACH resource set with the corresponding repetition number of times is not present).

As another method, a method for separately allocating a PRACH resource and transmission related information (e.g., a corresponding repetition number of times and/or bundle start/configuration SF, etc.) to be used for scheduling may be considered.

FIG. 10 is a flowchart illustrating an example of a method according to the present invention. In the example of FIG. 10, it is assumed that a plurality of PRACH resource (sets) is preconfigured for transmission of a PRACH signal, different repetition numbers are preconfigured with respect to a plurality of PRACH resource (sets), and a UE selects a PRACH resource among the plurality of preconfigured PRACH resource (sets) and transmits a PRACH signal (by as much as a repetition number of times corresponding to the corresponding PRACH resource).

Referring to FIG. 10, in operation S1002, in order to perform an initial random access procedure (or a most recent random access procedure), the UE may repeatedly transmit a first PRACH signal using a first PRACH resource (by as much as a repetition number of times corresponding to the first PRACH resource). Then, in operation S1004, the UE may successfully receive an RAR signal for the first PRACH signal.

In operation S1006, the UE may transmit a second PRACH signal for scheduling request. In this case, a PRACH resource for transmission of the second PRACH signal for scheduling request may be determined based on the first PRACH signal for an RAR signal that is successfully received, as described above.

For example, when the first PRACH resource corresponds to one of a plurality of preconfigured PRACH resource (sets), the second PRACH signal may be repeatedly transmitted by as much as a repetition number of times configured for the first PRACH resource using the first PRACH resource.

As another example, when a repetition number of times of the first PRACH signal corresponds to one of a preconfigured repetition number of times for a plurality of PRACH resource (sets), the second PRACH signal may be repeatedly transmitted by as much as a repetition number of times of the first PRACH signal using a PRACH resource corresponding to the repetition number of times of the first PRACH signal.

As another example, when the first PRACH resource does not correspond to a plurality of PRACH resource (sets) and a repetition number of times of the first PRACH signal does not correspond to a preconfigured repetition number of times with respect to a plurality of PRACH resource (sets), the second PRACH signal may be transmitted using a PRACH resource corresponding to a smallest repetition number of times (or a greatest repetition number of times less than a repetition number of times of the first PRACH signal) greater than a repetition number of times of the first PRACH signal among a plurality of PRACH resources.

In the case of PRACH transmission performed according to indication (e.g., reception of a PDCCH order, etc.) from an eNB, a PRACH resource and transmission related information (e.g., corresponding repetition number of times and/or bundle start/configuration SF, etc.) similarly to the above case, and/or (when the PRACH resource and transmission related information are referred to as "PRACH-rep info set" for convenience), a plurality of PRACH-rep info sets with different PRACH repetition numbers may be configured, and when a UE first transmits a PRACH bundle with a smallest repetition number of times (for example, when a PDCCH order is received) based on the PRACH-rep info sets and fails to receive/detect RAR corresponding to the PRACH bundle (e.g., a PDCCH order is re-received), PRACH repetition number of times may be increased using a method for transmitting a PRACH bundle with a second smallest repetition number of times. As another method, (when one or more PRACH-rep info sets are preconfigured), a repetition number of times (or information corresponding thereto) for PRACH bundle transmission may be directly indicated through a PDCCH order.

(By generalizing the above proposal) when a method for selecting a PRACH resource corresponding to PRACH repetition number of times which RAR is successfully received in an initial access or recent random access procedure) is defined as Method 1, a method for selecting a PRACH resource corresponding a PRACH repetition number of times that is separately allocated through a higher layer signal (such as (UE-specific) RRC signaling except for SIB), a PDCCH (order) signal, etc. is defined as Method 2, a method for selecting a PRACH resource corresponding to a smallest repetition number of times among PRACHs configured for SIB is defined as Method 3, and a method for selecting a PRACH resource corresponding to a repetition number of times that is estimated based on specific measurement (e.g., reference signal received power (RSRP)) among PRACHs configured for SIB is defined as Method 4, whether Method 1 or another method (Method 2, 3, or 4) is applied during transmission of a PRACH (in an RRC connected mode) and/or whether Method 3 or Method 4 is applied may be configured for the UE (using a UE-common or UE-specific method).

In the case of the above methods (e.g., Method 3 or 4), different methods may be applied according to a step/time/situation at which a random access produce is performed. For example, whether the random access is random access in initial access and RRC idle mode or random access in an RRC connected mode, different methods may be applied. For example, in an RRC idle mode (including initial access), there is the possibility that latency increment and/or accuracy degradation with respect to measurement (e.g., RSRP) (in terms of average-sense) over a plurality of SF durations in consideration of a coverage-limited situation in which an operation is performed based on repetition is relatively increased. Accordingly, Method 3 may be applied to the case of a random access procedure in an RRC idle mode (including initial access) (or only to initial access). On the other hand, Method 4 may be applied to the case of a random access procedure in an RRC connected mode in which a burden of measurement latency/accuracy is relatively low (or the remaining cases except for initial access).

Support of Different Coverage Enhancement (CE) Between DL/UL

In the case of some UEs, DL coverage and UL coverage may be differ. For example, some UEs may require repeated application for transmission of a UL channel/signal in order to ensure a proper level of UL performance/operation with respect to the UL coverage (which is referred to as a "UL CE mode") but may ensure a proper level of DL reception performance/operation without repeated application to transmission of a DL channel/signal with respect to the DL coverage (which is referred to as a "DL non-CE mode"). In the case of these UEs, it may be effective in terms of overall system overhead/latency to preconfigured related information/parameters so as to apply repetition to transmission of a UL channel/signal (e.g., PRACH and/or Msg3) in an initial access procedure over a plurality of SFs but to support an operation (i.e., a combination of a UL CE mode and a DL non-CE mode) for one time transmission/reception through only one SF without repetition like a conventional case in the case of a DL channel/signal (e.g., RAR and/or Msg4).

In addition, when repetition is performed for coverage enhancement, since a PDCCH can also be repeated, cross-SF scheduling may be used. The cross-SF scheduling may refer to a case in which data transceiving and a grant information transceiver for the same are performed in different subframes. For example, when a last PDCCH in a PDCCH bundle is transmitted in SF #n, a start PDSCH in a PDSCH may be transmitted in SF #(n+1). When a repetition number of times is 1, the case in which cross-SF scheduling is not used may be considered. For example, when a PDCCH bundle size is 1, the UE may assume that the cross-SF scheduling is not used. The cross-SF scheduling is one example, and the UE may assume the case in which a PDCCH bundle size is 1 or a bundle size for DL channel/signals is 1 differently from the case in which a bundle size is greater than 1. This may be specific to a situation in which a coverage enhancement mode is enabled when a bundle size of transmission of a UL channel/signal is greater than 1.

As a method for determining a UE that can operate using this method by an eNB, RAR (and/or Msg4) corresponding to a specific PRACH (and/or Msg3) resource configured with a repetition number of times equal to or greater than 2 and a PDCCH repetition number of times corresponding thereto may be configured to 1 (i.e., to be transmitted once without repetition like in a conventional case) via LCT-dedicated (or MTC-dedicated) second-type-dedicated SIB. Accordingly, when a UE that receives the corresponding LCT-dedicated (or MTC-dedicated) second-type-dedicated SIB performs PRACH preamble transmission using a corresponding specific PRACH resource, transmission of RAR (and/or Msg4) corresponding thereto may be performed for reception through one SF like in a conventional case without repetition according to setting of corresponding LCT-dedicated (or MTC-dedicated) second-type-dedicated SIB. In this case, reception timing/duration for RAR (e.g., RAR window start/configuration SF) may also apply a conventional method or may configure a method to be applied among a conventional method or a CE mode method (to which a repetition number of times of 1 is applied). In this case, a method by which the UE operates may be determined according to timing or a repetition number of times in which RAR is transmitted. For example, when an SF in which RAR is transmitted corresponds to an SF that cannot be used in the case of transmission using a coverage enhancement mode method, this means that the RAR is transmitted in a normal coverage mode, and thus it may be assumed that the UE may operate in a normal coverage mode. As another method, a CE mode or a conventional method may be determined according to whether cross-SF scheduling is applied. In addition, a mode in which the UE operates among a coverage enhancement mode and a normal coverage mode may be signaled in RAR or may be configured together when PRACH repeated level/number of times is configured for SIB.

As another method, a LCT-dedicated (or MTC-dedicated) second-type-dedicated PRACH resource (e.g., with a repetition number of times of 2 or more) to which repeated transmission is applied may be configured (irrespective of a legacy PRACH resource to which repetition is not applied) through a legacy SIB. In this case, a UE that performs PRACH preamble transmission using the corresponding LCT-dedicated (or MTC-dedicated) second-type-dedicated PRACH resource configured for the legacy SIB may operate so as to receive RAR (and/or Msg4) corresponding to the second-type-dedicated PRACH resource and PDCCH transmission corresponding thereto through one SF (without repetition) like in a conventional case. In this case, a conventional method may also be applied to reception timing/duration (e.g., RAR window start/configuration SF) for the RAR or a method among a conventional method and a CE mode method (to which a repetition number of times of 1 is applied) may be configured. In this case, the UE may determine a method by which the UE operates may be determined according to timing or a repetition number of times in which RAR is transmitted. For example, when an SF in which RAR is transmitted is an SF that cannot be used in the case of transmission using a coverage enhancement mode method, this means that the RAR is transmitted in a normal coverage mode, and thus it may be assumed that the UE may operate in a normal coverage mode. As another method, a CE mode or a conventional method may be determined according to whether cross-SF scheduling is applied. In addition, a mode in which the UE operates among a coverage enhancement mode and a normal coverage mode may be signaled in RAR or may be configured together when PRACH repeated level/number of times is configured for SIB.

A UE to which repetition based coverage enhancement is applied in order to reduce a burden of use of a receiving buffer of the UE may be configured such that a PDCCH repeated transmission duration and a PDSCH repeated transmission duration corresponding thereto may not overlap each other. This configuration may be referred to as "cross-SF scheduling". In this case, even if repetition is exceptionally applied to UL transmission with respect to a UE to which a combination of a UL CE mode and a DL non-CE mode is applied, a conventional method (i.e., a method for transmitting a PDCCH and a PDSCH corresponding thereto through one SF) may be applied to DL transmission without change. A method for transmitting grant information (or PDCCH) and data (or PDSCH) scheduled by the same through the same SF may be referred to as "same-SF scheduling". As another method, a method to be applied to the corresponding UE among the cross-SF scheduling method and the same-SF scheduling method may be pre-signaled (through an SIB, etc.). As another method, a method to be applied to a corresponding UE by default among the above two methods (the cross-SF scheduling method and the same-SF scheduling method) may be pre-defined or a method to be applied to the UE may be changed/configured via additional specific signaling (e.g., UE-specific RRC signaling) while operating in a mode configured via SIB, etc.

Configuring a Plurality of DL CE Levels to Single UL Coverage Enhancement (CE)

As another method, in a situation in which a corresponding PRACH repetition number of times (and/or Msg3 repetition number of times, etc.) is independently (or differently) configured for each UL coverage enhancement requirement (which is referred to as a UL CE level, for convenience), a setting method for corresponding a plurality of different DL CE levels (e.g., RAR repetition number of times and/or Msg4 repetition number of times, etc.) to one UL CE level may be considered in order to support the above various (or different) UL/DL CE level combinations. Here, a repetition number of times, configuration SF information, etc. which are applied to transmission of UL channel/signal (e.g., PUSCH and/or PUCCH) as well as PRACH (and/or Msg3) may correspond/be configured to each UL CE level, and a repetition number of times, configuration SF information, etc. which are applied to transmission of a DL channel/signal (e.g., PDSCH and/or PDCCH) as well as RAR (and/or Msg4) may correspond/be configured to each DL CE level. On the other hand, a method for configuring a plurality of different UL CEs as corresponding to one DL CE level may also be used.

For example, a plurality of (e.g., 2) RAR repetition number of times $Nr\_1$ and $Nr\_2$ may be configured to correspond to a PRACH repetition number of times Np corresponding to one specific UL CE level. The UE may perform Np repeated transmissions on a corresponding PRACH and then perform an RAR reception/detection operation while assuming each of two corresponding RAR repetition number of times (i.e., $Nr\_1$ and $Nr\_2$) to determine a final Nr value corresponding to RAR that is successfully received/detected (among $Nr\_1$ and $Nr\_2$) as a DL CE level of the UE. Then, DL channel/signal repetition configuration corresponding thereto may be applied and then a DL reception operation may be performed. In this case, when RAR reception/detection is simultaneously successful with respect to a plurality of repetition numbers, the UE may determine repetition configuration corresponding to a smallest value among the corresponding plurality of RAR repetition numbers as a DL CE level of the UE. Repetition corresponding to a smallest value may be determined as a DL CE level of the UE. It may be preferable in terms of DL resource overhead to determine repetition configuration corresponding to a smallest value as a DL CE level. For convenience of description, a procedure for performing an RAR reception/detection operation on a plurality of repetition numbers and applying DL channel/signal repetition configuration corresponding to RAR that is successfully received/detected is referred to as "RAR blind decoding (BD)".

As another method for configuring a plurality of DL CE levels as corresponding to one UL CE level, a PRACH repetition number of times (and UL repetition number of times and transmission SF configuration information including the same) may be configured so as to differentiate PRACH preamble resources (applied repetition number of times are the same) corresponding to respective DL CE levels in a state in which the same PRACH repetition number of times corresponds/is configured to the corresponding plurality of DL CE levels in time/frequency/code.

On the other hand, as another method for configuring a plurality of UL CE levels as corresponding to one DL CE level, an RAR repetition number of times (and a DL repetition number of times including the same and transmission SF configuration information) may be configured such that an RAR (and/or PDCCH for scheduling the same) transmission resource corresponding to each UL CE level is differentiated in terms of time/frequency/code rate, etc. while the same RAR repetition number of times is configured to correspond/be configured to the corresponding plurality of UL CE levels.

A PRACH power ramping method with respect to a case in which a plurality of DL CE levels corresponds/is configured to a single UL CE level may be performed by sequentially applying one calculated UE transmit power value to all PRACH resources corresponding to one PRACH repetition number of times and then sequentially re-applying (one) ramping-up UE power to all PRACH resources. In this case, an order for applying one UE transmit power to a plurality of PRACH resources may be from a low level to a high level of a corresponding DL CE level (e.g., DL channel/signal repetition number of times).

For example, a plurality of (e.g., 2) PRACH resources 1 and 2 allocated to one PRACH repetition number of times Np may correspond to different RAR repetition numbers $Nr\_1$ and $Nr\_2$ (e.g., $Nr\_1 < Nr\_2$). Assuming that initial (first) UE transmit power is Pu and next (second) UE power after power ramping is applied is Pu+Pr, a corresponding UE may first perform PRACH transmission by applying power value Pu to PRACH resource 1 corresponding to a low value $Nr\_1$, may perform PRACH transmission by re-applying a power value Pu to PRACH resource 2 corresponding to a next high value $Nr\_2$ (when RAR fails), and then may perform sequent PRACH transmission by applying Pu+Pr to PRACH resource 1, applying Pu+Pr to PRACH resource 2, applying Pu+2Pr to PRACH resource 1, and applying Pu+2Pr to PRACH resource 2 (until RAR is successfully received).

As another method for configuring a plurality of DL CE levels as corresponding to one PRACH repetition level (and UL repetition number of times and transmission SF configuration information including the same), when different PRACH resources (with the same repetition number of times, which are differentiated in time/frequency/code) correspond/are configured for respective transmission power values/ranges (or information for deriving the same) of a UE, which are used for a PRACH signal, different DL CE levels may be applied according to transmit power and/or transmitting resource used for PRACH signal transmission to perform a DL reception operation.

For example, (when transmit power of a UE is Pu), different UE transmit power ranges Pu-range 1 (e.g., $X \le Pu < Y$) and Pu-range 2 (e.g., $Y \le Pu < Z$) may correspond to a plurality of (e.g., 2) PRACH resources 1 and 2 allocated to one PRACH repetition number Np, respectively. In addition, different RAR repetition numbers $Nr\_1$ and $Nr\_2$ may correspond to a corresponding plurality ogyorf PRACH resources 1 and 2 (or Pu-ranges 1 and 2), respectively. Accordingly, Pu that is determined by applying initial power setting, PRACH power ramping, and the like (based on measured path-loss, etc.) is within Pu-range 1, a UE may perform transmission through PRACH resource 1 corresponding to Pu and then perform an RAR reception/detection operation assuming a repetition number of times $Nr\_1$. When Pu is within Pu-range 2, the UE may perform transmission through PRACH resource 2 corresponding to Pu and then perform an RAR reception/detection operation assuming a repetition number of times Nr_2.

In addition, when one or more DL CE levels are configured to correspond to one PRACH repetition level (and UL repetition number of times and transmission SF configuration information including the same), different PRACH resource may correspond/be set for respective transmit power values/ranges (or information for deriving the same) of a UE, which is used for a PRACH signal) so as to use different PRACH resources according to transmit power applied to the PRACH signal. In the case of different PRACH resources, applied repetition number of times are the same but can be differentiated in time/frequency/code, and different PRACH resources may be used according to transmit power applied to a PRACH signal without separate correspondence/setting from a DL CE level. A DL CE level for a corresponding UE may be determined through RAR BD and/or then may be configured/reconfigured through an appropriate procedure.

In addition, when one or more DL CE levels are configured to one PRACH repetition level (and UL repetition number of times and transmission SF configuration information including the same), the corresponding UE may report transmit power information (or information for deriving the same) of a UE, which is used in PRACH (repeated) transmission corresponding to received/detected RAR directly to an eNB through Msg3 transmission (or next PUSCH transmission) (in a situation without separate correspondence/setting between the aforementioned PRACH transmit power/resources or a situation in which corresponding setting is given). The eNB may appropriately re-set a next UL CE level (e.g., UL channel/signal repetition number of times) to be applied to the corresponding UE based on the reported transmit power information. In this case, a DL CE level for the corresponding UE may also be determined through RAR BD and/or may be set/re-set through an appropriate procedure.

In all of the methods, in the case of different PRACH resources with the same repetition number of times, which are differentiated in time/frequency/code, independent (different) UL channel/signal (e.g., PUSCH and/or PUCCH (as well as Msg3)) repetition number of times and transmission SF configuration information may be correspond to the different PRACH resources. A UE that succeeds in RAR reception/detection corresponding to specific PRACH resource transmission may apply UL repetition information corresponding/set to a corresponding specific PRACH resource with respect to next UL transmission (as well as Msg3).

Method for Identifying and Supporting LCT Type (or Low-Cost Type) Second Type UE As described above, for a coverage-limited UE (or a UE configured to perform repeated transmission for CE), a separate PRACH resource (referred to as a CE PRACH resource) (which applies repeated transmission) which can be differentiated from a legacy PRACH resource used by a legacy UE may be configured. In addition, for PRACH repeated transmission appropriate for a plurality of CE levels, different CE PRACH resources may be allocated for respective CE levels (which apply different repetition numbers and/or can be differentiated in CDM/TDM/FDM, etc.).

According to technologies for low-cost/low-specifications of a LCT second type UE, reduction in the number of reception antennas, reduction in a maximum TB size, reduction in a reception buffer size, etc. may be considered. In particular, the reception buffer size may be achieved by reducing a frequency duration/range of a reception target (e.g., by limiting only a small number of specific RBs). In the case of various control channels (e.g., PCFICH, PHICH) as well as a PDCCH, RE/REG/CCE, etc. constituting the control channel may be transmitted over an entire system BW through a series of procedures such as interleaving, and thus it may be difficult to reduce a reception frequency duration/range (i.e., a reception bandwidth) with respect to the corresponding control channel. On the other hand, in the case of a PDSCH as a data channel, RE, and the like constituting the PDSCH may be limitedly transmitted only to a specific frequency resource (e.g., specific RB region) according to scheduling of an eNB, and thus a reception bandwidth (e.g., RB number) for the PDSCH may be reduced so as to reduce a received data buffer size. For convenience, a LCT second type UE with low-cost/low-specifications, which can be achieved according to this technology, may be referred to as a "low-cost UE", (maximum) data scheduling/reception (available) bandwidth allocated to the low-cost UE may be referred to as "scheduling bandwidth (BWLC)", and data transmission scheduled for an actual low-cost UE may be limited to RBs belonging to the corresponding scheduling bandwidth.

In order to support the low-cost UE, an eNB (may identify/recognize the corresponding low-cost UE and) may need scheduling so as to transmit/receive a PDSCH corresponding to RAR and Msg4 through only RBs in a scheduling bandwidth BWLC from an RACH procedure for initial access. To this end, a separate PRACH resource (referred to as an LC PRACH resource) differentiated from a legacy PRACH resource may be re-configured for the low-cost UE such that an eNB may perform scheduling of RAR/Msg4 corresponding to LC PRACH resource transmission (from the low-cost UE) within only a scheduling bandwidth BWLC. However, when a coverage-limited low-cost UE (referred to as a CE LC UE) that requires PRACH repeated transmission is also considered, different CE PRACH resources (referred to as CE LC PRACH resources) differentiated for respective CE levels may be allocated similarly to the above description. However, allocation of the CE LC PRACH may cause depletion of PRACH transmitting resources and degradation in PRACH reception performance in terms of an entire system due to excessive PRACH resource dimensioning.

As one method for this, a method for setting a separate LC PRACH resource differentiated from a legacy PRACH resource only for a non-CE LC UE and commonly setting a CE PRACH resource for each CE level for all CE UEs (including an LC UE and any UE that is not the LC UE) that require CE may be considered. In addition, the corresponding LC PRACH resource setting information may include scheduling bandwidth information for scheduling corresponding RAR and/or Msg4. Similarly, the corresponding CE PRACH resource setting information (for each CE level) may include scheduling bandwidth information for scheduling the corresponding RAR and/or Msg4.

In the above method, in the case of the non-CE LC UE, the UE may select/transmit an LC PRACH resource such that an eNB identifies/recognizes an LC type. On the other hand, in the case of the CE LC UE, the eNB cannot identify/recognize an LC type only by selecting/transmitting a CE PRACH resource by the UE, and thus the CE LC UE may notify the eNB that the UE is an LC type through Msg3. In addition, the eNB may differently allocate Msg3 transmitting resources corresponding to the two respective UE types (i.e., LC type or non-LC type) to RAR (e.g., Msg3 transmitting resources may be allocated to use different RBs and/or different DMRS cyclic shifts) so as to identify/ recognize a UE type according to a Msg3 receiving resource. The method may also be applied to the case in which a separate LC PRACH resource is not configured for a non-CE LC UE.

Thus far, the description has been given in terms of the case in which repeated transmission and reception are performed for coverage enhancement of a second type UE, but it may be understood that the principle according to the present invention is not restrictedly applied only to the repeated transmission and reception. In particular, the present invention may also be applied to the case in which repeated transmission and reception are not performed in the same/similar way.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Figure 11:
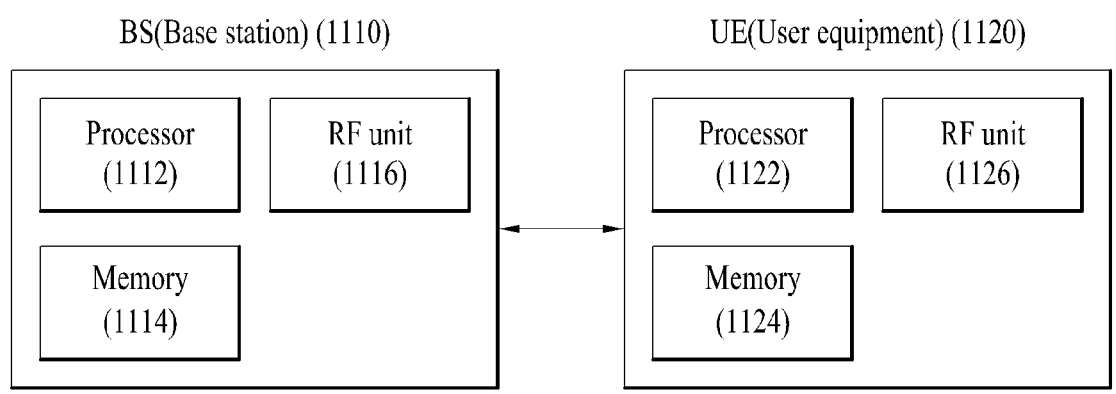
FIG. 11 illustrates a BS and a UE to which the present invention is applicable.

FIG. 11 illustrates a BS and a UE to which the present invention is applicable.

Referring to FIG. 11, a wireless communication system includes the BS 1110 and the UE 1120. When the wireless communication system includes a relay, the BS 1110 or the UE 1120 may be replaced with the relay.

The BS 1110 includes a processor 1112, a memory 1114, and a radio frequency (RF) unit 1116. The processor 1112 may be configured to embody the procedures and/or methods proposed by the present invention. The memory 1114 is connected to the processor 1112 and stores various pieces of information associated with an operation of the processor 1112. The RF unit 1116 is connected to the processor 1112 and transmits/receives a radio signal. The UE 1120 includes a process 1122, a memory 1124, and an RF unit 1126. The processor 1122 may be configured to embody the procedures and/or methods proposed by the present invention. The memory 1124 is connected to the processor 1122 and stores various pieces of information associated with an operation of the processor 1122. The RF unit 1126 is connected to the processor 1122 and transmits/receives a radio signal.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, methods according to the present invention may be implemented in the form of a module, a procedure, a function, etc which are configured to perform the functions or operations as described in the present specification. Software code may be stored in a computer-readable medium in the form of instructions and/or data and may be executed by a processor. The computer-readable medium is located at the interior or exterior of the processor and may transmit and receive data to and from the processor via various known means.

It will be apparent to those skilled in the art that various modifications and variations can be made in the present invention without departing from the scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (B S), etc.

The invention claimed is:

1. A method for performing a random access procedure by a user equipment (UE) in a wireless communication system supporting coverage enhancement, the method comprising:
   receiving a physical downlink control channel (PDCCH) order from a base station, the PDCCH order initiating the random access procedure;
   selecting a physical random access channel (PRACH) resource indicated by the PDCCH order from among a plurality of PRACH resources configured for the UE; and
   repeatedly transmitting a PRACH preamble with a number of repetitions corresponding to the selected PRACH resource,
   wherein each of the plurality of PRACH resources comprises a different number of repetitions for transmitting the PRACH preamble, and
   wherein the number of repetitions for transmitting the PRACH preamble is indicated by the PDCCH order.

2. The method according to claim 1, wherein each of the plurality of PRACH resources further comprises a start subframe for transmitting the PRACH preamble, and a subframe configuration for transmitting the PRACH preamble.

3. The method according to claim 1, further comprising:
   repeatedly receiving a random access response (RAR) from the base station in response to the PRACH preamble,
   wherein a number of repetitions for receiving the RAR is configured specifically for each of the plurality of PRACH resources.

4. The method according to claim 3, further comprising:
   repeatedly transmitting a physical uplink shared channel (PUSCH) to the base station based on the RAR,
   wherein a number of repetitions for transmitting the PUSCH is configured specifically for each of the plurality of PRACH resources.

5. The method according to claim 4, further comprising:
   repeatedly receiving a physical downlink shared channel (PDSCH) from the base station in response to the PUSCH,
   wherein a number of repetitions for receiving the PDSCH is configured specifically for each of the plurality of PRACH resources.

6. The method according to claim 1, further comprising:
   when the UE fails to receive a RAR in response to the PRACH preamble, increasing the number of repetitions and repeatedly transmitting the PRACH preamble with the increased number of repetitions.

7. A user equipment (UE) for performing a random access procedure in a wireless communication system supporting coverage enhancement, the UE comprising:
- a radio frequency (RF) unit; and
- a processor operatively connected to the RF unit and configured to:
  - receive a physical downlink control channel (PDCCH) order from a base station through the RF unit, the PDCCH order initiating the random access procedure,
  - select a physical random access channel (PRACH) resource indicated by the PDCCH order from among a plurality of PRACH resources configured for the UE, and
  - repeatedly transmit a PRACH preamble with a number of repetitions corresponding to the selected PRACH resource,
- wherein each of the plurality of PRACH resources comprises a different number of repetitions for transmitting the PRACH preamble, and
- wherein the number of repetitions for transmitting the PRACH preamble is indicated by the PDCCH order.

8. The user equipment (UE) according to claim 7, wherein each of the plurality of PRACH resources further comprises a start subframe for transmitting the PRACH preamble, and a subframe configuration for transmitting the PRACH preamble.

9. The user equipment (UE) according to claim 7, wherein the processor is further configured to:
- repeatedly receive a random access response (RAR) from the base station through the RF unit in response to the PRACH preamble,
- wherein a number of repetitions for receiving the RAR is configured specifically for each of the plurality of PRACH resources.

10. The user equipment (UE) according to claim 9, wherein the processor is further configured to:
- repeatedly transmit a physical uplink shared channel (PUSCH) to the base station based on the RAR through the RF unit,
- wherein a number of repetitions for transmitting the PUSCH is configured specifically for each of the plurality of PRACH resources.

11. The user equipment (UE) according to claim 10, wherein the processor is further configured to:
- repeatedly receive a physical downlink shared channel (PDSCH) from the base station through the RF unit in response to the PUSCH,
- wherein a number of repetitions for receiving the PDSCH is configured specifically for each of the plurality of PRACH resources.

12. The user equipment (UE) according to claim 7, wherein the processor is further configured to:
- when the UE fails to receive a RAR in response to the PRACH preamble, increase the number of repetitions and repeatedly transmit the PRACH preamble with the increased number of repetitions.

* * * * *